(12) United States Patent
Aratani et al.

(10) Patent No.: US 7,697,068 B2
(45) Date of Patent: Apr. 13, 2010

(54) APPARATUS AND METHOD WITH RECEIVING OF BROADCAST DATA SIGNAL, COMMUNICATING WITH EXTERNAL DEVICE, AND CONTROLLING IMAGE TO BE DISPLAYED IN ACCORDANCE WITH COMMUNICATION

(75) Inventors: Shuntaro Aratani, Tokyo (JP); Yoshikazu Shibamiya, Kanagawa (JP); Shigeki Mori, Saitama (JP); Katsuhiro Miyamoto, Kanagawa (JP); Tomoyuki Ohno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1257 days.

(21) Appl. No.: 09/987,569

(22) Filed: Nov. 15, 2001

(65) Prior Publication Data

US 2002/0060748 A1    May 23, 2002

(30) Foreign Application Priority Data

Nov. 17, 2000    (JP) ............................. 2000-351988

(51) Int. Cl.
*H04N 7/00* (2006.01)
*H04N 7/16* (2006.01)
*H04N 11/00* (2006.01)
*H04N 5/44* (2006.01)

(52) U.S. Cl. ...................... 348/553; 348/460; 348/461; 348/465; 348/473; 348/552; 348/734; 725/141

(58) Field of Classification Search ......... 348/460–461, 348/465, 473–474, 552–553; 725/133, 141, 725/153, 144; *H04N 5/44, 7/00, 7/08, 11/00*
See application file for complete search history.

(56) References Cited

U.S. PATENT DOCUMENTS

| | | | |
|---|---|---|---|
| 4,165,520 A * | 8/1979 | Wessler et al. ............... | 358/409 |
| 4,910,689 A | 3/1990 | Shibamiya | |
| 5,070,404 A * | 12/1991 | Bullock et al. ............... | 348/460 |
| 5,500,681 A * | 3/1996 | Jones ......................... | 348/473 |
| 5,552,833 A * | 9/1996 | Henmi et al. ................ | 348/460 |
| 5,978,013 A * | 11/1999 | Jones et al. .................... | 725/23 |
| 6,052,556 A * | 4/2000 | Sampsell ..................... | 725/133 |
| 6,064,440 A * | 5/2000 | Born et al. ................... | 348/478 |
| 6,084,638 A * | 7/2000 | Hare et al. ................... | 348/552 |

(Continued)

FOREIGN PATENT DOCUMENTS

| | | |
|---|---|---|
| JP | 9-149325 | 6/1997 |
| JP | 11-313191 | 11/1999 |
| JP | 2000-036949 | 2/2000 |

OTHER PUBLICATIONS

Newton's Telecom Dictionary, 18$^{th}$ Edition, by Harry Newton, p. 5 and 786.*
Hiroshi Seno, et al., "A Consideration of Data Transmission Method for Enhanced Teletext (PRESENT: Personal REquest Service by ENhanced Teletext)", ITEJ (Institute of Television Engineers of Japan) Technical Report, vol. 16, No. 71, Oct. 29, 1992, pp. 1-6, (No Translation Provided).

*Primary Examiner*—Brian P Yenke
(74) *Attorney, Agent, or Firm*—Fitzpatrick, Cella, Harper & Scinto

(57) ABSTRACT

A television signal receiving apparatus receives television signals including broadcast data signals and outputs the received data signals to a display device. The display device displays an image that has characters and/or pictures generated from the data signals. A communication unit of the receiving apparatus is connected to and communicates with an external device. A control unit controls the image to be displayed on the display device according to results of communication with the communication unit.

7 Claims, 23 Drawing Sheets

U.S. PATENT DOCUMENTS

| | | | |
|---|---|---|---|
| 6,091,456 A * | 7/2000 | Schaas ........................ 348/460 |
| 6,243,707 B1 * | 6/2001 | Humpleman et al. ......... 707/102 |
| 6,295,092 B1 * | 9/2001 | Hullinger et al. ............. 348/468 |
| 6,426,778 B1 * | 7/2002 | Valdez, Jr. ................... 348/461 |
| 6,430,357 B1 * | 8/2002 | Orr ............................... 386/69 |
| 6,577,347 B2 * | 6/2003 | Nishio et al. ................. 348/465 |
| 6,647,535 B1 * | 11/2003 | Bozdagi et al. .............. 715/530 |
| 6,668,158 B1 | 12/2003 | Tsutsui et al. ............... 455/12.1 |
| 6,750,883 B1 * | 6/2004 | Parupudi et al. ............. 715/763 |
| 6,774,951 B2 * | 8/2004 | Narushima ................... 348/552 |
| 6,816,201 B1 * | 11/2004 | Fang et al. ................... 348/468 |
| 6,842,906 B1 * | 1/2005 | Bowman-Amuah ......... 719/330 |
| 6,868,292 B2 * | 3/2005 | Ficco et al. .................... 700/19 |
| 6,870,570 B1 * | 3/2005 | Bowser ....................... 348/552 |
| 6,870,571 B1 * | 3/2005 | Narushima et al. .......... 348/552 |
| 6,912,504 B1 * | 6/2005 | Rashkovskiy ................ 705/14 |
| 6,912,688 B1 * | 6/2005 | Zhou et al. ................. 715/500.1 |
| 6,915,332 B1 * | 7/2005 | Zdepski ...................... 709/206 |
| 6,928,413 B1 * | 8/2005 | Pulitzer ......................... 705/14 |
| 6,938,270 B2 * | 8/2005 | Blackketter et al. .......... 725/112 |
| 6,944,880 B1 * | 9/2005 | Allen ........................... 725/106 |
| 6,961,097 B2 * | 11/2005 | Yui ............................. 348/584 |
| 6,961,555 B1 * | 11/2005 | Philyaw ...................... 455/403 |
| 6,963,935 B1 * | 11/2005 | Young et al. ................... 710/29 |
| 6,968,364 B1 * | 11/2005 | Wong et al. .................. 709/217 |
| 6,968,365 B2 * | 11/2005 | Hollstrom et al. ............ 709/217 |
| 2001/0022003 A1 | 9/2001 | Narushima ................... 725/133 |
| 2003/0164898 A1 * | 9/2003 | Imai ............................ 348/465 |
| 2003/0164976 A1 * | 9/2003 | Ihara et al. ................. 358/1.15 |
| 2003/0169450 A1 * | 9/2003 | Kawai ........................ 358/1.15 |
| 2003/0227645 A1 * | 12/2003 | Hisatomi et al. ............ 358/1.13 |
| 2005/0024678 A1 * | 2/2005 | Kawai ........................ 358/1.15 |
| 2005/0172331 A1 * | 8/2005 | Blackketter et al. .......... 725/135 |
| 2005/0240471 A1 * | 10/2005 | Pourhamid .................... 705/14 |
| 2005/0243207 A1 * | 11/2005 | Narushima et al. ........... 348/552 |
| 2006/0028553 A1 * | 2/2006 | Mori et al. ............. 348/207.99 |

* cited by examiner

```
<!DOCTYPE dbc SYSTEM "http://www.xxx.co.jp/dbc.dtd" >
<head>
<title News AM7</title>>

<script language = "JavaScript" >
var pdntenable = ();

function initialize(){                                          // (B)
   printenable = Browser.GetBrowserSupport("print")              // (C)
      var imag = document.getElementById("pngPrintBtn");
      var para = document.getElementbyId("pPrintBtn");
   if(printenable ==1){                                          // (D)
      imag.style.visibility = "visible"
      para.style.visibility = "visible"
   }
   else{
      imag.style.visibility = "hidden"
      para.style.visibility = "hidden"
   }
}
```

FIG. 4

```
function keydown(){
  var code = documet.currentEvent.keyCode;
  if(code == "UP"){
    if( --focusmenu <0){focusmenu = 3;}
  }
  if(code == "UP"){
    if( --focusmenu <0){focusmenu = 3;}
  }
  if(code == "ABC"){                                              // (E)
    if(focusmenu == 0){browser.launchDocument("seiji.xml");}
    if(focusmenu == 1){browser.launchDocument("keizai.xml");}
    if(focusmenu == 2){browser.launchDocument("shakai.xml");}
    if(focusmenu == 3){browser.launchDocument("sports.xml");}
  }
  if(code =="RED"){                                               // (F)
    var tmp = document.getElementByIe("pngPrintBtn");
    if(tmp.style.visivility == visible){browser.launchDocument("print.xml");}
  }
}
</script>
</head>
```

FIG. 5

```
<body onLoad = "initialize()" >
<div onkeydown = "keydown();"/>
<div style = "left:60px; top:40px; width:480px; height:270px;" >
  <object style = "left:0px; top:0px; width:480px; height:270px;" data = "/-1" type = "video/X-arib-mpeg2" remain = "remain"/>
  <object data = "/-1" type = "video/X-ariv-mpeg2-aac" streamstatus = "play"/>
</div>
<div style = "top:38px; left:583px; width:310px; height:463px">
  <p style = "left:4px; top:0px; width:300px; height:80px; font-size:24px; line-height:24px;>7 O'CLOCK MORNING NEWS</p>
  <div style = "top:90px; left:5px; width:300px; height:42px;" >
    <object id = "pngPlate0" data = "~/0001/plate.png" type = "image/X-atrib-png"/>
    <p id = "pMenu0" style = "top:5px; left:1px; width:300px; height:42px; font-size:24px" >POLITICS</p>
  </div>
  <div style = "top:140px; left:5px; width:300px; height:42px;" >
    <object id = "pngPlate1" data = "~/0001/plate.png" type = "image/X-atrib-png"/>
    <p id = "pMenu1" style = "top:5px; left:1px; width:300px; height:42px; "font-size:24px" >ECONOMY</p>
```

```
</div>
<div style = "top:190px; left:5px; width:300px; height:42px;" >
  <object id = "pngPlate2" data = "~/0001/plate.png" type = "image/X-atrib-png"/>
  <p id = "pMenu2" style = "top:5px; left:1px; width:300px; height:42px;" font-size:24px >LOCAL NEWS</p>
</div>
<div style = "top:240px; left:5px; width:300px; height:42px;" >
  <object id = "pngPlate3" data = "~/0001/plate.png" type = "image/X-atrib-png"/>
  <p id = "pMenu3" style = "top:5px; left:1px; width:300px; height:42px;" font-size:24px >SPORTS</p>
</div>
<div style = "left:70px; top:350px; width:480px; height:150px;" >
  <object id = "pngPrintBtn" style = "left:127px; top:20px; width:30px; height:30px" data = "Rbin.png" type = "image/X-atrib-png"/>
  <p id = "pPrintBtn" style = "left:164px; top:19px; width:200px; height:30px; font-size:24px >PRINT NEWS SUMMARY</p>
</div>
</body>
```

FIG. 7

```
<!DOCTYPE dbc SYSTEM "http://www.xxx.co.jp/dbc.dtd" >
<head>
<title>News Print</title>
<script language = "JavaScript" >
var printenable = 0;
function initialize(){
    var rdy = browser.pmSetReady();                                                  // (B)
    if(rdy == 0){                                                                    // (C)
        document.getElementById("StatusText").firstChild.data = "PRINTER IS SET TO BE READY FOR PRINTING";
        return;
    }
    //SPECIFICATIONS OF PRINTER ARE EXAMINED
    var spc = browser.pmGetSpec("size", "A4");
    if(spec == 0){
        var spc = browser.pmGetSpec("size", "A3");
        if(spec == 0){
            document.getElementById("StatusText").firstChild.data = "STATUS : NO USABLE PRINTER IS AVAILABLE";
            return;
        }
        document.getElementById("StatusText").firstChild.data = "STATUS : PRINTER IS NOT COMPATIBLE
            WITH REQUIRED SHEET SIZE";
        return;
    }
    document.getElementById("StatusText").firstChild.data = "STATUS : READY TO PRINT";    // (D)
}
function print(){
    var result = browser.pmStart("/printdeta.xml");
    if(result == 1){
        document.getElementById("StatusText").firstChild.data = "STATUS : PRINTING COMPLETED";    // (E)
    }
}
```

FIG. 9

```
else{
    document.getElementByld("StatusText");firstChild.data = "STATUS : PRINTING ABORTED";
}
browser.clearTimer(timerId);
timerId browser.setInterval("proccess_timer_event();",5000,120);              //(F)
} function proccess_timer_event(){
    var sts = browser.prnGetStatus("printing");                                //(G)
    if(sts == 1){
        document.getElementByld("StatusText");firstChild.data = "STATUS : NOW PRINTING";
    }
    else{
        sts = browser.prnGetStatus("err_stop");
        if(sts== 1){
            document.getElementByld("StatusText");firstChild.data = "STATUS : PRINTER STOPS DUE TO AN ERROR";
        }
        else{
            finished();
            browser.clearTimer(timerId);
        }
    }
} function finished(){
    document.getElementByld("StatusText");firstChild.data = "STATUS : PRINTING COMPLETED";  //(H)
}
</sript>
</head>
```

FIG. 10

```
//(A)
<body onLoad = "initialize()" >
<div style = "left:60px; top:40px; width:480px; height:270px" >
<object style = "left:0px; top:0px; width:480px; height:270px;" data = "/1" type = "video/X-arib-mpeg2" remain = "remain"/>
<object data = "/-1" type = "vidio/X-arib-mpeg2-aac" streamstatus = "play"/>
</div>
<div style = "top:38px; left:583px; width:310px; height:463px" >
<p style = "left:4px top:0px; width:300px; height:80px; font-size:24px; line-height:24px; >NEWS SUMMARY IS PRINTED</p>
<div style = "top:90px; left:5px; width:300ps; height:42px;" >
<object id = "pngPlate0" data = "/0001/plate.png" type = "image/X-arib-png"/>
<p id = "pMenu0" style = "top:5px; left:1px; width:300px; height:42px; font-size:24px" >PRINTING STARTS</p>
</div>
<p id = "StatusText" style = "left:4px; top:130px; width:300px; height:80px; font-size:24px; line-height:24px; >STATUS : PREPARATION FOR PRINTING IS IN PROGRESS</p>
</div>
<div style = "left:70px; top:350px; width:480ps; height:150px;" >
<p id = "pPrintBtn" style = "left:164px; top:19px; width:200px; height:30px; font-size:24px >PRESS RETURN KEY TO RETURN TO MENU</p>
</div>
</body>
```

FIG. 11

```
<!DOCTYPE dbc SYSTEM "http://www.xxx.co.jp/dbc.dtd" >
<head>
<title News Print</title>

<script language = "JavaScript" >
var printenable = 0;

function initialize(){
    if(rdy == 0){
        document.getElementById("StatusText").firstChild.data = "STATUS : CONNECT PRINTER";   return;
    }
} function print(){
    var result = browser.prnStart("~/printdata.xml");
    if(result == 1){
        document.getElementById("StatusText").firstChild.data = "STATUS : NOW PRINTING";
    }
} functuion proccess_device_event(){
    device = document.currentEvent.DeviceGroup;
    event = document.currentEvent.EventID;
    value = document.currentEvent.Value;
```

```
if(device == "printer" && event == "device_attached"){                                                              //(C)
    document.getElementByld("StatusText").firstChild.data = "STATUS : PRINTER IS RECOGNIZED, AND CHECKED.";         //(D)
    var spc = browser.pmGetSpec("inaxsize", "A4");
    if(spec == 0){
        document.getElementByld("StatusText").firstChild.data = "STATUS : PRINTER IS NOT COMPATIBLE WITH REQUIRED SHEET SIZE";
        return;
    }
    document.getElementByld("StatusText").firstChild.data = "STATUS : READY TO PRINT";
}
if(device == "printer" && event == "print_finished"){                                                               //(E)
    document.getElementByld("StatusText").firstChild.data = "STATUS : PRINTING COMPLETED";
}
if(device == "printer" && event == "print_resumed"){                                                                //(F)
    document.getElementByld("StatusText").firstChild.data = "STATUS : PRINTING RESUMING";
}
if(device == "printer" && event == "ink_empty"){                                                                    //(G)
    document.getElementByld("StatusText").firstChild.data = "STATUS : LACK OF INK";
    document.getElementByld("objVideo").data = "ink_change.mpg";
    document.getElementByld("objAudio").data = "ink_change.mpg";
}
if(device == "printer" && event == "paper_empty"){                                                                  //(H)
    document.getElementByld("StatusText").firstChild.data = "STATUS : LACK OF COPY SHEETS";
}
</script>
</head>
```

FIG. 18

```
<de_event>
  <de_item type = "DeviceEventFired" subscribe = "subscribe" device_group = "printer" onecur = "preccess_device_event();"/>    //(I)
</de_event>

<body onLoad = "initialize()">                                                                                                 //(A)
<div style = "left:50px; top:40px; width:480px; height:270px;">
  <object Id = "objVideo" style = "left:0px; top:0px; width:480px; height:270px;" data = "/-1" type = "video/X-arib-mpeg2" remain = "remain"/>
  <object id = "objAudio" data = "/-1" type = "audio/X-arib-mpeg2-aac" streamstatus = "play"/>
</div>
<div style = "top:38px; left:583; width:310px; height:463px">
  <p style = "left:4px; top:0px; width:300px; height:80px; font-size:24px; line-height:24px;>NEWS SUMMARY IS PRINTED</p>
  <div style = "top:90px; left:5px; width:300px; height:42px;">
    <object Id = "pngPlate0" data = "/0001/plate.png" type = "image/X-arib-png"/>
    <p id = "pMenu0" style = "top:5px; left:1px; width:300px; height:42px; font-size:24px>PRINTING STARTS</p>
  </div>
  <p Id = "StatusText" style = "left:4px; top:150px; width:300px;height:80px; font-size:24px; line-height:24px;>STATUS :</p>
</div>
<div style = "left:70px; top:350px; width:480px; height:150px;">
  <p id = "pPrintBtn" style = "left:164px; top:19px; width:200px; height:30px; font-size:24px>PRESS RETURN KEY TO RETURN TO MENU</p>
</div>
</body>
```

FIG. 19

APPARATUS AND METHOD WITH RECEIVING OF BROADCAST DATA SIGNAL, COMMUNICATING WITH EXTERNAL DEVICE, AND CONTROLLING IMAGE TO BE DISPLAYED IN ACCORDANCE WITH COMMUNICATION

BACKGROUND OF THE INVENTION

1. Field of the Invention

The present invention relates to methods, apparatus, and systems for receiving a television signal, receiving and reproducing broadcast data, and, more particularly to methods, and apparatus, and systems for receiving television signals, appropriate for use in the signal processing of a broadcast data receiving television receiver which receives, displays, and reproduces data content, broadcast from a broadcasting station, which contains multiplexed characters, pictures, audio, and video.

2. Description of the Related Art

It is increasingly the case that terrestrial and satellite broadcasting stations have begun to broadcast television signals which include data signals. In this so-called data broadcasting, data from the station is superimposed on a carrier frequency and transmitted using a broadcasting radio wave. The data, received and stored in a receiver, is read into a personal computer or a dedicated terminal, and is then displayed using a widely available WWW (World Wide Web) browser software program.

In addition to personal computers and dedicated terminals, the data broadcasting service may be received by a television receiver, and new services making use of data broadcasting are expected. Specifically, by installing a receiver function for receiving broadcast data and a reproducing software program (a browser) in a television receiver itself, one can easily gain access to a wide range of information (independent data broadcasting) and enjoy service in which information linked with a television program is provided in text or pictures (program linked data broadcasting), even without a personal computer.

Standards covering such service in Japan include ARIB STD B24 standardized by the Association of Radio Industries and Businesses (ARIB). The construction of a television receiver for receiving satellite digital broadcast data will now be discussed referring to FIG. 25. The television receiver includes a tuner 251, a descrambler 252, a transport decoder 253, an audio decoder 254, a video decoder 255, a D/A converter 256, a loudspeaker 257, a CPU (Central Processing Unit) 258, a graphics generator 259, a moving-picture plane 260, a still-picture plane 261, a character/drawing plane 262, an image synthesizer 263, and a display unit 264.

To transmit data, a broadcasting station encodes program data of ordinary television programs, audio data, and data to be broadcast. These coded signals are first multiplexed and modulated, and then transmitted from an antenna. The signal transmitted from the antenna is delivered via a broadcasting satellite (BS) to a user terminal such as a personal computer, a dedicated terminal or a television receiver.

In operation, the tuner 251 in the television receiver selects a signal within a frequency band of a channel corresponding to a program selected by the user from among the received signals. The tuner 251 demodulates the input signal, subjects the demodulated signal to an error correction process, generates digital data in a form called a transport stream (TS), and outputs the digital data to the transport decoder 253 via the descrambler 252. The transport decoder 253 then extracts a packet of the digitized data corresponding to the program selected by the user.

Video data within the extracted packet is decoded by the video decoder 255, and is then sent to the moving-picture plane 260 within a graphics buffer. Audio data within the extracted packet is decoded by the audio decoder 254, and is output to the loudspeaker 257. The broadcast data in the extracted packet is sent to the CPU 258 and is decoded there. The decoded data is then stored in a data storage device.

When the content of broadcast data is displayed, the CPU 258 reads data stored in the data storage device and converts the data into an image of characters and drawings through the graphics generator 259, and then sends the image to the character/drawing plane 262 or the still-picture plane 261 in the graphics buffer. The character/drawing plane 262 mainly stores bit images of buttons serving as UI (User Interface) in data broadcasting, text, graphics, and pictures, and the still-picture plane 261 mainly stores bit images of photographic pictures. The image synthesizer 263 performs a synthesis process for synthesizing graphic data stored in the moving-picture plane 260, the character/drawing plane 262, and the still-picture plane 261 in the graphics buffer, and then outputs the synthesized data to the display unit 264.

Digital data is commonly broadcast using the DSM-CC data carousel defined in the ISO/IEC Standard 13818-6. The broadcast data, filtered through the transport decoder 253, includes text information, script information, picture information, and video and audio data, and the text information is described in the XML (extensible Markup Language) defined in the World Wide Web Consortium (W3C).

It has been recognized that convenience will be enhanced even further if the information delivered by data broadcasting service is displayed on a television screen and printed out for permanent record. To receive and print out the broadcast data, a personal computer receives the broadcast data at a broadcast data receiving board, stores the data and then prints out the data using a dedicated application program such as, for example, the program disclosed in Japanese Patent Laid-Open No. 11-313191, (Owada et al.) which teaches a system that delivers information of newspapers, magazines, and posters to a dedicated terminal.

The above-described conventional art has disadvantages. In the above-described method of storing and printing data using a personal computer, the personal computer needs to be prepared with a required software program installed therewithin. Also, a display content is printed out "as is," in other words, the size and layout of characters are not optimized for printing.

For example, in the system proposed by Owada et al. in the above-cited Japanese Patent Laid-Open No. 11-313191, data is merely delivered to a dedicated printer device. Thus, the user is unable to enjoy videos of broadcast display data content or digital broadcasting using the same device.

In this way, the print content and the display content are independently handled in the conventional art, and the receiver is a separate unit. This independent treatment limits functionalities, because, for example, a content creator (a provider) cannot deliver the display content as a print content, or cannot mix a button or an icon for content printing in a broadcast display data content.

Also, since the display process and the printing process of the broadcast data content are independent from each other in the conventional art, the display process of the broadcast data content cannot be concurrently performed in parallel with the printing process.

SUMMARY OF THE INVENTION

Accordingly, it is a first object of the present invention to provide a television signal receiving method and apparatus, a broadcast data receiving and reproducing apparatus, and a storage medium, each of which provides a novel service of printing out information in addition to the conventional data broadcasting service which permits only video and audio reproduction.

In one aspect of the present invention, a television signal receiving apparatus for receiving television signals including broadcast data signals, includes a receiver for receiving the data signals, an output unit for outputting the data signals, received by the receiver, to a display device, which displays an image including characters and/or pictures, generated from the data signals, a communication unit for communicating with an external device connected thereto, and a control unit for controlling the image to be displayed on the display device in accordance with results of communication with the communication unit.

In another aspect of the present invention, a television signal receiving apparatus for receiving television signals including broadcast data signals, includes a receiver for receiving the data signals, a display unit for displaying a plurality of images including an image relating to the data signals received from the receiver, a print data output unit for creating print data based on the data signals and for outputting the print data to a printer device, and a display control unit for monitoring the status of the printer device and for changing a display content to be presented on the display unit in accordance with the status of the printer device.

In yet another aspect of the present invention, a broadcast data receiving and reproducing apparatus for receiving broadcast data and for presenting a variety of displays of data including the broadcast data, includes a print data output unit for forming print data based on the broadcast data and layout information and for outputting the print data to a printer device, and a control unit which generates display data based on the broadcast data and the layout information and displays the display data on a display unit, while executing a script based on results of communication with the printer device.

In yet another aspect of the present invention, a television signal receiving method for receiving television signals including broadcast data signals, includes the steps of receiving the data signals, outputting the data signals, received in the receiving step, to a display device, which displays an image including characters and/or pictures, generated from the data signals, communicating with an external device connected thereto, and performing controlled modification of the image to be displayed on the display device in accordance with communication results in the communication step.

In a further aspect of the present invention, a broadcast data receiving and reproducing system includes a broadcast data receiving and reproducing apparatus for receiving broadcast data and for presenting a variety of displays of data including the broadcast data, and an external device with which the broadcast data receiving and reproducing apparatus communicates. The broadcast data receiving and reproducing apparatus includes a receiver for receiving data broadcasting radio waves, an acquisition unit for acquiring at least one of moving-picture data, audio data, still-picture data, and character data multiplexed on the data broadcasting radio waves, a display unit for displaying a variety of displays including the data acquired by the acquisition unit, a communication unit for communicating with the external device, and a display control unit for controlling the display unit to change the display content on the display unit based on results of communications with the external device.

In a still further aspect of the present invention, a broadcast data receiving and reproducing system includes a broadcast data receiving and reproducing apparatus for receiving broadcast data and for presenting a variety of displays of data including the broadcast data, and a printer device with which the broadcast data receiving and reproducing apparatus communicates. The broadcast data receiving and reproducing apparatus includes a receiver unit for receiving data broadcasting radio waves, an acquisition unit for acquiring at least one of moving-picture data, audio data, still-picture data, and character data multiplexed on the data broadcasting radio waves, a display unit for displaying a variety of displays including the data acquired by the acquisition unit, a communication unit for communicating with the printer device, a print data output unit for forming print data based on stored data, and outputting the print data to the printer device, and a display control unit which monitors the status of the printer device, and changes the display content on the display unit based on the status of printer device.

In yet another aspect of the present invention, a television signal receiving apparatus for receiving broadcast television signals including data signals, representing an image including characters and/or pictures, includes a receiver, a display device in communication with said receiver by a signal outputter, a communicator connected to an external device, and a controller in communication with said communicator. The receiver receives the data signals, the outputter outputs the data signals received by the receiver to the display device, the display device displays an image including characters and/or pictures generated from the data signals, and the controller controls the image to be displayed in accordance with results of communication with the communicator.

Further objects, features, and advantages of the present invention will be apparent from the following description of the preferred embodiments with reference to the attached drawings.

BRIEF DESCRIPTION OF THE DRAWINGS

FIG. 4 explains XML data for a startup screen in accordance with the first embodiment of the present invention.

FIG. 5 explains the XML data for the startup screen in accordance with the first embodiment of the present invention.

FIG. 6 explains the XML data for the startup screen in accordance with the first embodiment of the present invention.

FIG. 7 explains the XML data for the startup screen in accordance with the first embodiment of the present invention.

FIG. 9 explains XML data for a print screen in accordance with the first embodiment of the present invent ion.

FIG. 10 explains the XML data for the print screen in accordance with the first embodiment of the present invention.

FIG. 11 explains the XML data for the print screen in accordance with the first embodiment of the present invention.

FIG. 17 explains XML data for a print screen in accordance with a second embodiment of the present invention.

FIG. 18 explains the XML data for the print screen in accordance with the second embodiment of the present invention.

FIG. 19 explains the XML data for the print screen in accordance with the second embodiment of the present invention.

DESCRIPTION OF THE PREFERRED EMBODIMENTS

Figure 1:
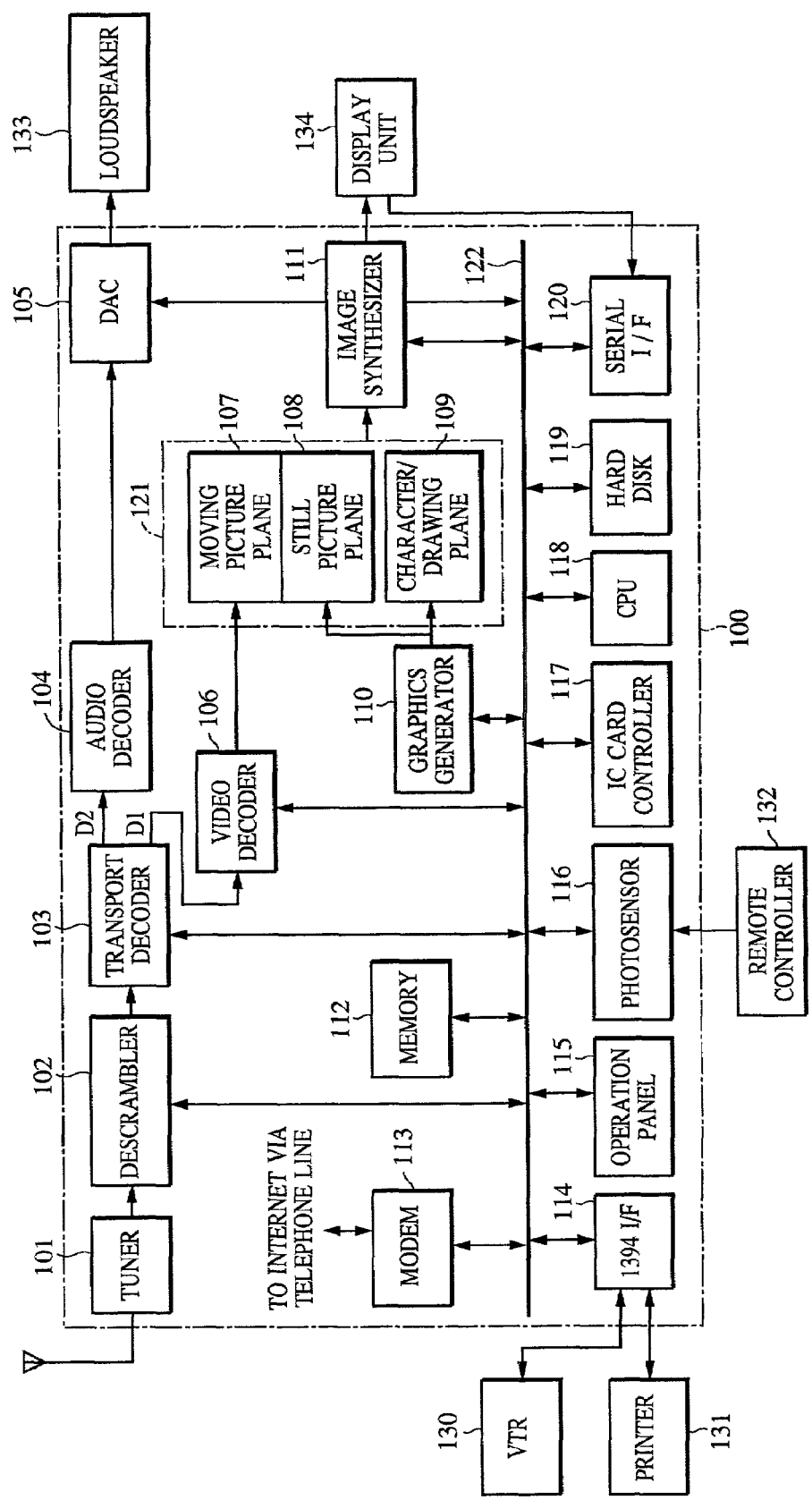
FIG. 1 is a block diagram showing the construction of a digital television receiver of a first embodiment of the present invention.

Referring to the drawings, the embodiments of the present invention will now be discussed.

First Embodiment

FIG. 1 is a block diagram showing the construction of a digital television receiver 100 in accordance with the first embodiment of the present invention. The digital television receiver 100 includes a tuner 101, a descrambler 102, a transport decoder 103, an audio decoder 104, a D/A converter 105, a video decoder 106, a graphics buffer 121 containing a moving-picture plane 107, a still-picture plane 108, and a character/drawing plane 109, a graphics generator 110, an image synthesizer 111, a memory 112, a modem 113, an IEEE1349 interface 114, an operation panel 115, a photosensor 116, an IC card controller 117, a CPU 118, a hard disk 119, a serial interface 120, and a bus 122. Also shown are a VTR (Video Tape Recorder) 130, a printer 131, a remote controller 132, a loudspeaker 133, and a display unit 134.

A signal, received from an antenna, is input to the tuner 101. The tuner 101 demodulates the input signal and subjects it to an error correction process, and generates a digital data in a form called a transport stream (TS). The tuner 101 outputs the generated transport stream (TS) to the descrambler 102. The TS data output by tuner 101 is scrambled to restrict viewing. Consequently the descrambler 102 descrambles the TS data based on key information contained in the TS data for descrambling and key information output from the IC card controller 117. The descrambled TS data is then output to the transport decoder 103.

The IC card controller 117 includes an IC card which stores contact information of a user and key information for deciphering key information used to descramble the TS data. The IC card controller 117 outputs the key information to the descrambler 102 when the tuner 101 outputs the key information contained in the TS data. When the descrambler 102 receives unscrambled TS data from the tuner 101 the descrambler 102 outputs the TS data to the transport decoder 103.

The transport decoder 103, upon receipt of the TS data, extracts a packet corresponding to a program selected by the user. The video data of the extracted packet is decoded by the video decoder 106, and is then sent to the moving-picture plane 107 in the graphics buffer 121. The audio data of the extracted packet is decoded by the audio decoder 104 and is then sent to the loudspeaker 133 via the D/A converter 105.

The broadcast data of the extracted packet is read into the memory 112 via the bus 122 to which the CPU 118, discussed in detail below, is connected. After being decoded by the CPU 118, in a manner discussed in detail below, the data broadcast data is stored in the hard disk 119. When the data broadcast content is displayed, the CPU 118 reads data stored in a data storage device (not shown), converts the data into image data of characters and pictures through the graphics generator 110, and then sends the image data to the character/drawing plane 109 or the still-picture plane 108 in the graphics buffer 121. The CPU 118 performs processes under the control of programs discussed below.

The image synthesizer 111 synthesizes and switches graphic data stored in the moving-picture plane 107, the character/drawing plane 109, and the still-picture plane 108 in the graphics buffer 121, and then outputs the resulting data to the display unit 134. The display unit 134 displays the received image, and contains a memory storing information about display screen size, etc. The information in the memory of the display unit 134 is sent to the digital television receiver 100 through a serial bus 122 connected between the digital television receiver 100 and the display unit 134, and is then stored in the memory 112 controlled by the CPU 118 through the serial interface 120 and the bus 122.

Also connected to the bus 122 are the IEEE (Institute of Electrical and Electronics Engineers) 1349 interface 114 and the modem 113. The IEEE1349 interface 114 allows the digital television receiver 100 to perform protocol communications with the VTR 130 and the printer 131. The modem 113, in a manner known in the art, is used to establish an Internet connection over a telephone line.

Digital data is usually broadcast using the DSM-CC data carousel defined in ISO/IEC Standard 13818-6. The broadcast data, filtered through the transport decoder 103, includes text information, script information, display layout information, print layout information, picture information, and video and audio data, and the text information is described in the XML (extensible Markup Language) defined in the World Wide Web Consortium (W3C).

The first embodiment of the present invention employs, as a broadcast data reproducing XML, a specification based on an XHTML specification which is obtained by reformulating an HTML (HyperText Markup Language) 4.0 with XML 1.0. In the XML, an attribute (meaning) is imparted to a character string in a text by using tags (a portion enclosed between <xxx> and </xxx>). The tags are used in a nested structure.

The first embodiment of the present invention employs a CSS (cascading style sheet) as a display format and JavaScript in a script process. A DOM (Document Object Model) is used as a form to gain access to content data from the script. The first embodiment of the present invention uses an extended DOM LEVEL recommended by the W3C.

Figure 2:
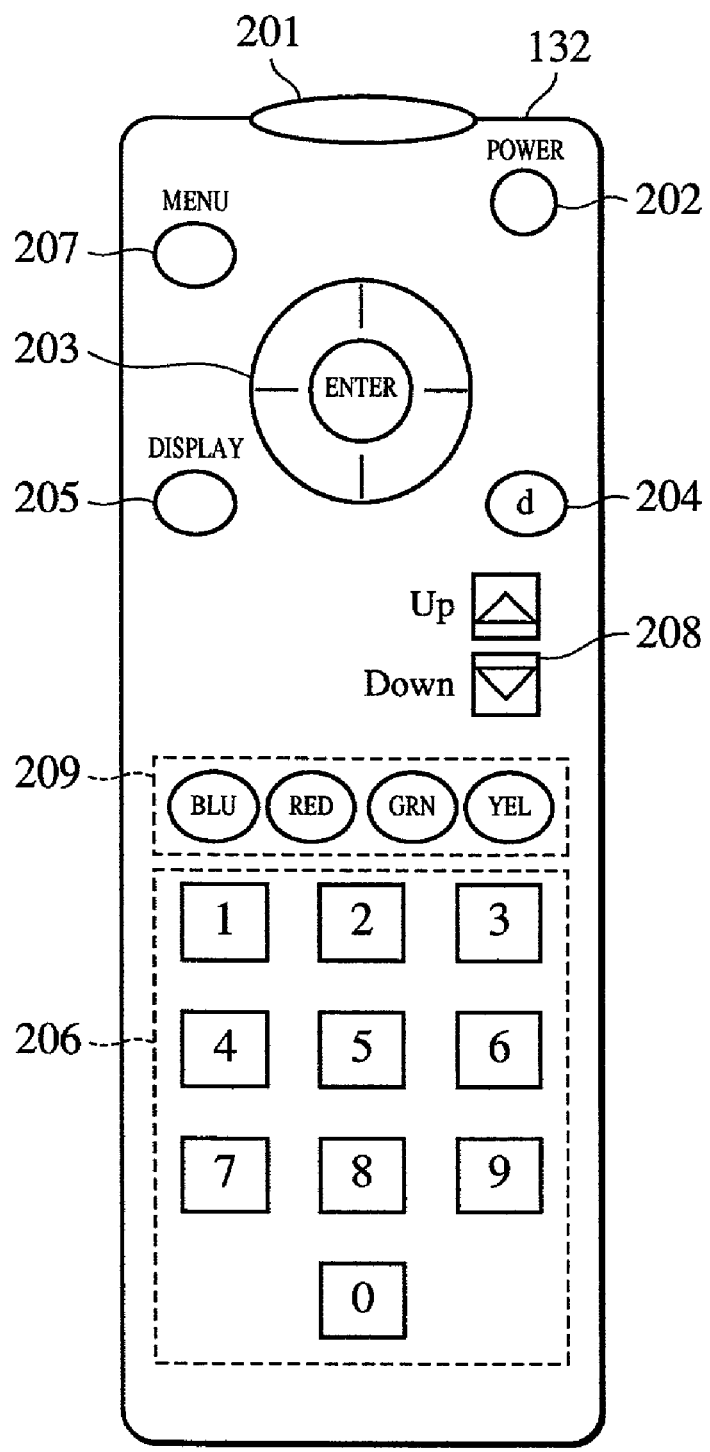
FIG. 2 is a front view of a remote controller of the digital television receiver of the first embodiment of the present invention.

The VTR 130 records and reproduces a program received by the digital television receiver 100. The printer 131 prints out an image on a recording medium such as a copy sheet in response to the print data sent from the digital television receiver 100. Referring to FIG. 2, the remote controller 132 includes various keys, as will be discussed later, and is used to control the digital television receiver 100 for various operations. The loudspeaker 133 outputs sound in response to the audio data output from the digital television receiver 100. The display unit 134 presents various displays in response to the video data sent from the digital television receiver 100.

FIG. 2 is a front view showing the construction of the remote controller 132 for the digital television receiver 100 of the first embodiment of the present invention. The remote controller 132 of the first embodiment of the present invention includes a photosensor unit 201, a power key 202, a cursor key 203, a "d" key (d button) 204, a display key 205, numerical keys 206, a menu button 207, up/down keys 208, and color keys 209. FIG. 2 shows only the keys for the function needed to discuss the present invention, and the buttons actually required in the digital television receiver 100 are not limited to these keys.

The remote controller 132 is now described. The photo unit 201 allows infrared communications to be established between the remote controller 132 and the operation panel 115 of the digital television receiver 100. The power key 202 switches the digital television receiver 100 on and off. When the cursor key 203 on a joystick is tilted upward or downward, or rightward or leftward, a cursor is moved in the respective four directions. Pressing the joystick itself enters the determined cursor position. The "d" key (d button) 204 is used to display the broadcast data.

The display key 205 switches the display on the display unit 134 of the digital television receiver 100. The numerical keys 206, a matrix of numerical keys, are used to enter numerals. The menu button 207 displays a menu screen on the display unit 134 of the digital television receiver 100. The up/down keys 208 are composed of two keys of one up key and one down key. The color keys 209 are composed of a blue key, a red key, a green key, and a yellow key arranged in a horizontal line.

The digital television receiver 100 of the first embodiment of the present invention will now be discussed, referring to flow diagrams of processes executed by the CPU 118 as shown in FIGS. 1 through 16.

Figure 3:
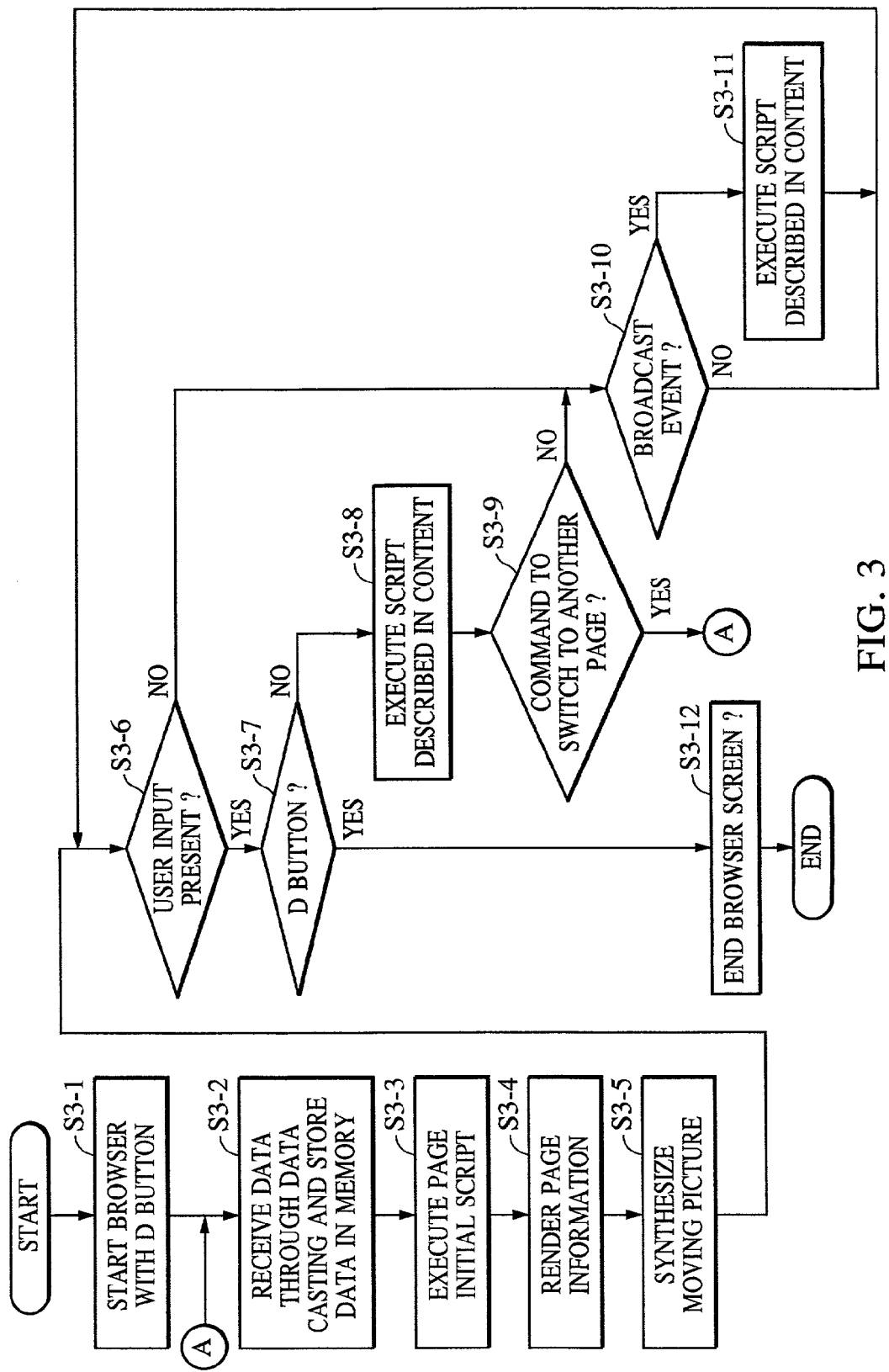
FIG. 3 is a flow diagram showing part of the operation of a data broadcasting browser in accordance with the first embodiment of the present invention.

FIG. 3 is a flow diagram showing the operation of the data broadcasting browser of the first embodiment of the present invention. When the user presses the d button 204 on the remote controller 132 during television viewing to display the broadcast data, the CPU 118 starts a broadcast data receiving and reproducing program (a browser) (step S31). In this way, the browser controls the transport decoder 103, thereby starting receiving the data broadcasting content transmitted in a data carousel method, acquiring the screen XML data and associated data such as a picture embedded in the XML data, and storing these pieces of data in the memory 112 (step S3-2).

FIGS. 4 through 7 illustrate the example of the XML data for a startup screen on data broadcasting which is linked with a news program in accordance with the first embodiment of the present invention. Included in a portion enclosed between <head> and </head> tags are a title element indicating the title of a document, and a <script> element defining the script. Included in the <body> element indicating a body of data are an <object> element indicating the picture and video and audio, a <div> element indicating an area on a screen, and a <p> element indicating a sentence. A style attribute complying with the CSS is described in each element, and coordinates, the size and color are set there during presentation.

When the browser obtains the image related to the XML data, a script function described in an OnLoad attribute (indicated by the letter A as shown in FIG. 3) of the <body> tag in the XML data is executed as an initial script (step S3-3 of FIG. 3). The script is described between the <script> tag and the </script> tag as shown in FIG. 4, and an initialize function (indicated by the letter B as shown) is an initial script in the first embodiment.

The operation of the script process with reference to FIG. 4 will now be discussed. A browser process for the extended DOM-API called in the script process will also be discussed together therewith. In the initialize function on the start screen, a function querying whether the browser presently executing the script has a broadcast data printing function (as indicated by the letter C as shown). The browser in the first embodiment includes an extended DOM-API called GetBrowserSupport as an embedded API which is called from the script. When provided with a character string "print" as a parameter, this API returns the value 1 (having a printing function) or the value 0 (having no printing function).

Since each of the digital television receiver 100 and the browser in the first embodiment has the broadcast data printing function, the return value of the API is 1. When the script is performed by a browser having no full-size display function, the return value of the API is 0. The script places the return value of the API into a visibility attribute that display permitted/display not permitted of a "printing function button guide" (as indicated by the letter D as shown).

After executing the initial script, the browser draws a button image and a text on the character/drawing plane 109 through the graphics generator 110 (step S3-4 in FIG. 3). At the same time, the browser controls the image synthesizer 111, thereby setting a synthesis process with the image on the moving-picture plane 107 (step S3-5 in FIG. 3).

Figure 8:
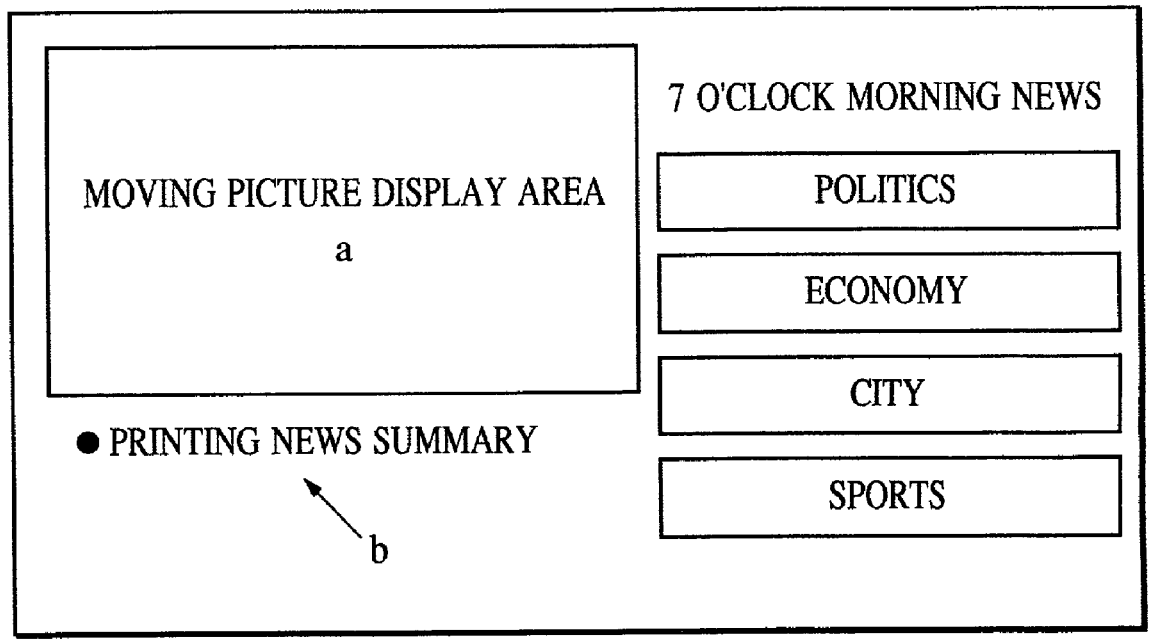
FIG. 8 shows a display example of the XML data in accordance with the first embodiment of the present invention.

FIG. 8 shows a display example of the XML data in accordance with the first embodiment of the present invention, displayed on the display unit 134 of the digital television receiver 100 using the browser. A rectangular area designated by a is a moving-picture window in which a moving picture is displayed. An image of the moving plane (a video of news here), which is typically displayed on an entire screen, is presented in a reduced scale. Presented on the remaining area other than the moving-picture window are drawings and characters which the browser, (i.e., the CPU 118) renders using the graphics generator 110.

The browser determines whether any action command has been input on the display on the screen shown in FIG. 8 by the user (step S3-6 in FIG. 3). When the user enters any action command, the browser determines whether the command is input by the d button 204 (step S3-7 in FIG. 3). When it is determined that the user presses the d button 204, the data broadcasting screen shown in FIG. 8 ends (step S3-12 in FIG. 3). When it is determined that the input is other than the input from the d button 204, the script in the content corresponding to the action command of the user is executed (step S3-8 in FIG. 3). When it is determined the input is a switch command to another page, the process proceeds to step S3-2, else the process proceeds to step S3-10.

When it is determined in step S3-6 that no action command is input from the user, then the browser determines whether an action command defined by a broadcasting station is input (step S3-10 in FIG. 3). When it is determined that an action command defined by the broadcasting station is input, a script (not shown) described in the content corresponding to the action command is executed (step S3-11 in FIG. 3).

The action command defined by the broadcasting station refers to an action such as performing a page switching a predetermined time later, or modifying the display form.

Presented on the right-hand side portion of the screen are panels which display detailed information such as "politics," and "economy." The user selects a desired panel using the cursor keys 203 on the remote controller 132 while this display is presented, and presses the enter key 203. In this way, the display screen is switched to another display (page) (a process designated by the letter E in FIGS. 4 through 7, and a process in step S3-9 in FIG. 3).

A "print button guide" bearing the phrase "printing news summary" as represented by the letter b in FIG. 8 is presented because a variable indicating the above-referenced display permitted attribute is 1. The "print button guide" shows the mark of a red button and a description of function to be carried out. The b area in FIG. 8 has a meaning that "the pressing of the red button 209 of the remote controller 132 performs a print function for printing the news summary." When the user presses the red button 209 on the remote controller 132 (shown in FIG. 2), the display screen is switched to a page for printing in the script function called KeyDown (as represented by the letter F in FIGS. 4 through 7 and step S3-9 shown in FIG. 3).

FIGS. 9 through 11 illustrate the XML data for performing the printing process in accordance with the first embodiment of the present invention. In the same manner as in the above-referenced startup, the broadcast data extracted by the transport decoder 103 is read into the memory 112, and the initialize function defined by the onload attribute of the body element is performed (step S3-2, and step S3-3 in FIG. 3, A and B in FIGS. 9 through 11). The initialize function reads the extended DOM-API called prnSetReady. When this function is called, the browser performs the process shown in FIG. 12.

The operation of the browser will now be discussed with reference to FIG. 12, a flow diagram showing part of the operation of the data broadcasting browser in accordance with the first embodiment of the present invention. The browser examines a device connected to an external bus (the IEEE1394 serial bus in the first embodiment), and determines that the device has a printing function (step S9-1 shown in FIG. 12). In the first embodiment, the browser reads a configuration ROM area in each IEEE1394 device (node), and a value at a unit_spec_id area, thereby determining whether the device has the printing function.

When the browser finds a printer (Yes in step S9-2 shown in FIG. 12), the browser reads and stores an ID of the device (step S9-3). In the first embodiment, a CRC value at the configuration ROM is used as the device ID. Since the node ID identifying the device on the bus changes a bus reset taking place subsequent to the detachment of the device in the IEEE1394, the present node ID of the device is checked using the device ID in the embodiment, and commands are sent to the same printer subsequent to the bus reset.

Figure 12:
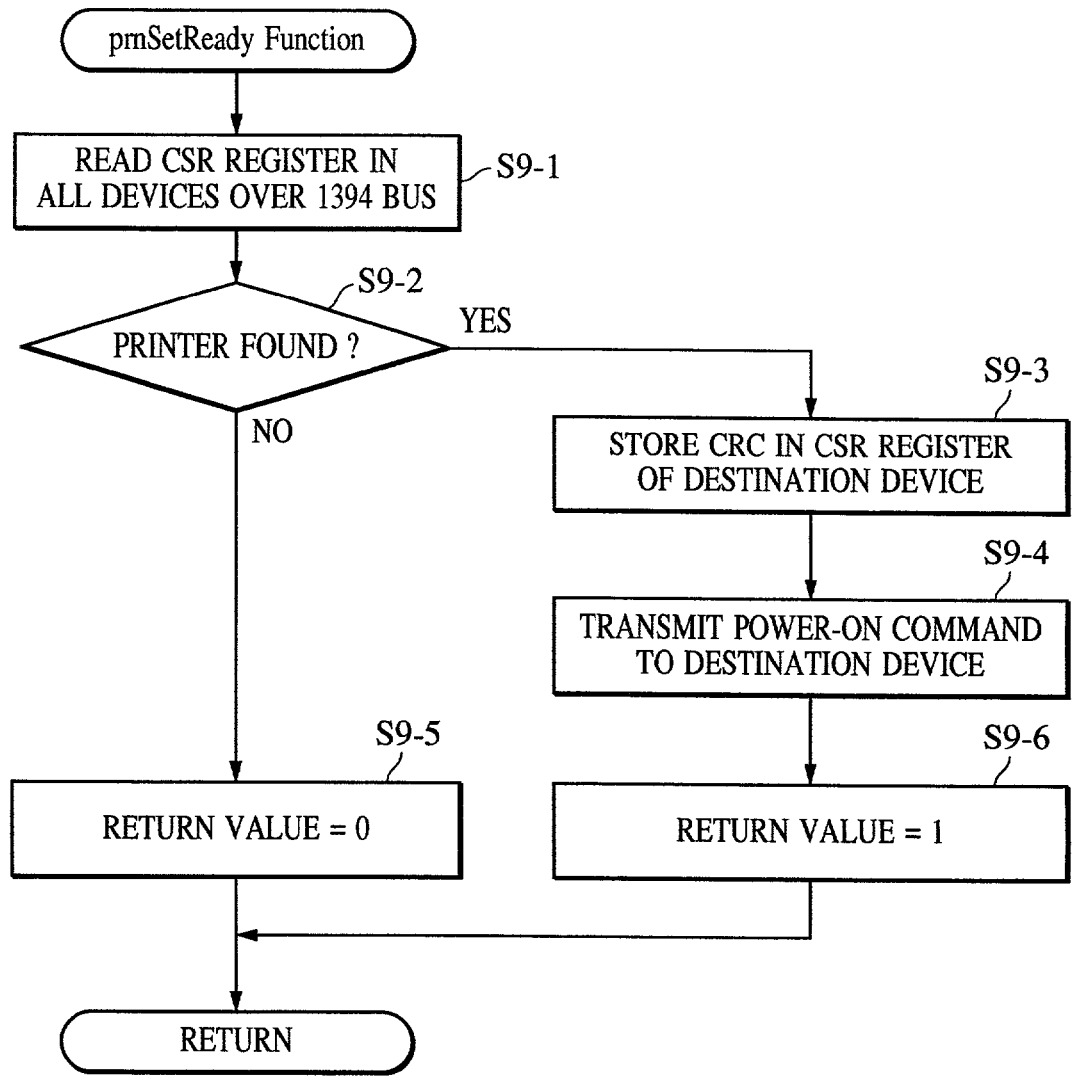
FIG. 12 is a flow diagram showing part of the operation of the data broadcasting browser in accordance with the first embodiment of the present invention.

The browser transmits, to the printer, a power command defined in the IEEE1394 AV/C Standard (step S9-4 shown in FIG. 12), transitions the printer to an on state, and returns 1 as a return value (step S9-6 shown in FIG. 12). When no printer is found (No in step S9-2 shown in FIG. 12), the return value of 0 is returned (step S9-5).

When 0 is received as the return value of the prnSetReady in the initialize function in FIGS. 9 through 11, a message reading "no usable printer is available" is displayed on a status display area, and this script process ends. The status display area, arranged in a predetermined area of the display screen, is used to describe the present status including communication results with the printer. The status display area is represented by the letter C in FIG. 14.

Figure 13:
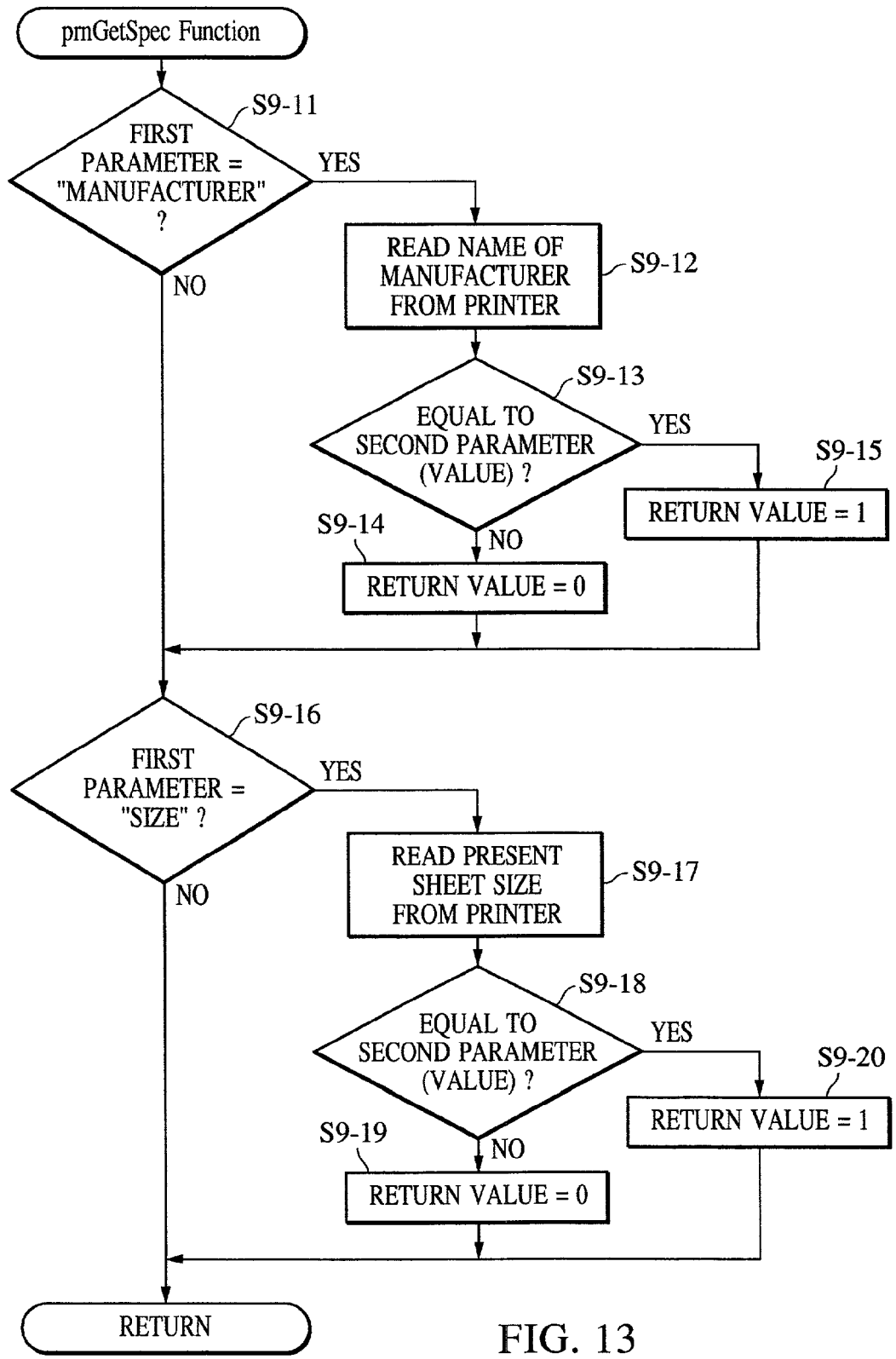
FIG. 13 is a flow diagram showing part of the operation of the data broadcasting browser in accordance with the first embodiment of the present invention.

When no printer is found, an extended DOM-API called prnGetSpec is read (D in FIGS. 9 through 11). FIG. 13 shows the browser process in this case.

FIG. 13 is a flow diagram showing part of the operation of the data broadcasting browser of the first embodiment of the present invention. The browser queries the printer about the manufacturer's name thereof (step S912) when a first parameter is set as a character string "maker" (Yes in step S9-11). When the manufacturer's name is identical to "canon" set in a second parameter (step S913), a return value of 1 is returned (step S9-15). Since the manufacturer's name is queried, no data train is shown.

The browser queries the printer about a sheet size presently printable (step S9-17) when a first parameter is set a character string "size" (Yes in step S9-16). When the sheet size coincides with a sheet size "A4" set in a second parameter (step S9-18), a return value of 1 is returned (step S9-20).

Figure 14:
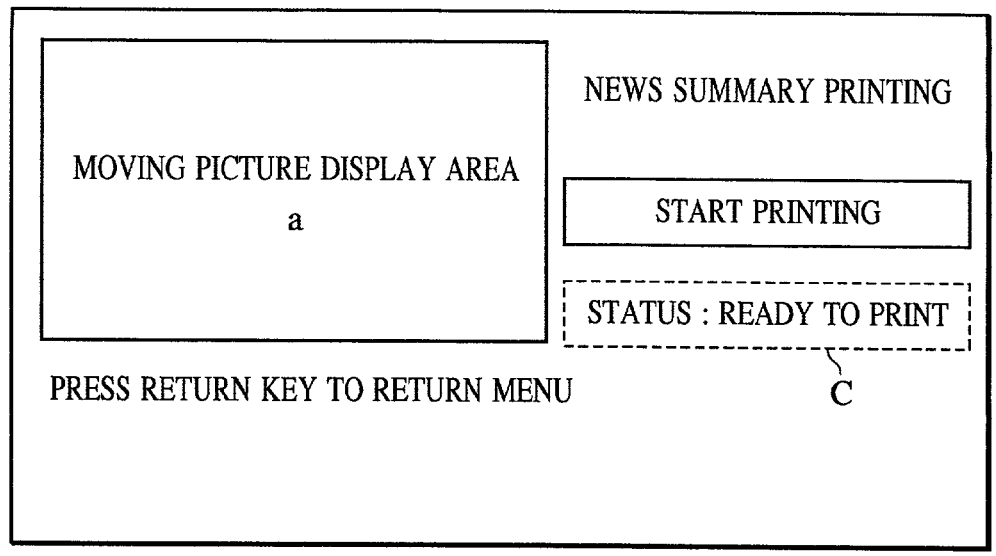
FIG. 14 shows a display example of the XML data in accordance with the first embodiment of the present invention.

When any of sheet sizes A4 and A3 is printable in the script process shown in FIGS. 9 through 11, the status display area presents a message reading "ready to print". When neither the A4 sheet nor the A3 sheet is printable, the status display area presents a message reading "printer is not compatible with the required sheet size." A display screen is organized in accordance with step S3-2 through step S3-5 in FIG. 3. FIG. 14 shows a resulting display.

FIG. 14 illustrates the display example of the XML data in accordance with the first embodiment of the present invention. When the user presses the enter key 203 on the remote controller 132 with the cursor placed on the print start button, the print function of the script shown in FIGS. 9 through 11 is executed (E shown in FIGS. 9 through 11), and prnStart of the extended DOM-API is called. In response to the call, the browser performs the process shown in FIG. 15.

Figure 15:
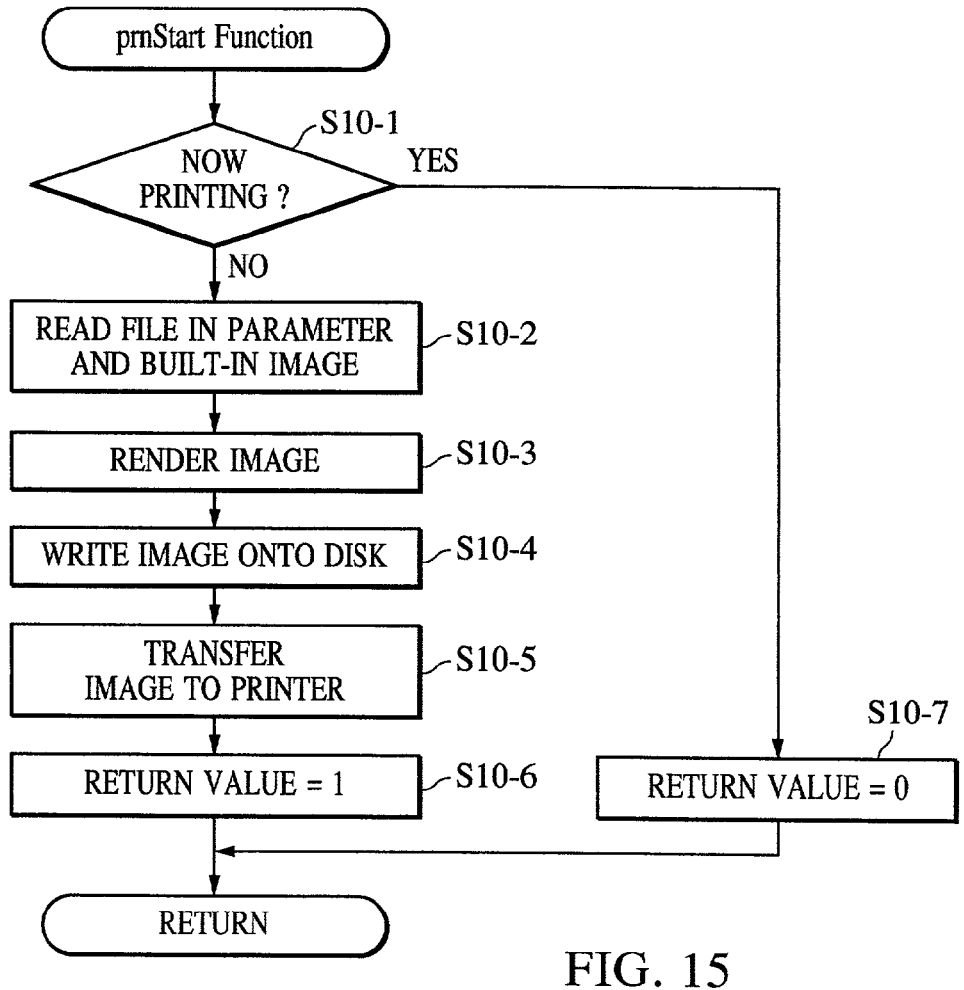
FIG. 15 is a flow diagram showing part of the operation of the data broadcasting browser in accordance with the first embodiment of the present invention.

FIG. 15 is a flow diagram showing part of the operation of the data broadcasting browser in accordance with the first embodiment of the present invention. The browser checks whether the printer 131 is now printing (step S10-1). When the browser determines that the printer 131 is not printing, a XML data file in response to the parameter is read into the memory 112, and image data required for the object element in the XML data is read (step S10-2).

The browser further performs rendering in accordance with a style definition (step S10-3), and stores the data in the hard disk 119 (step S10-4). The data is transferred to the printer 131 (step S10-5).

Figure 16:
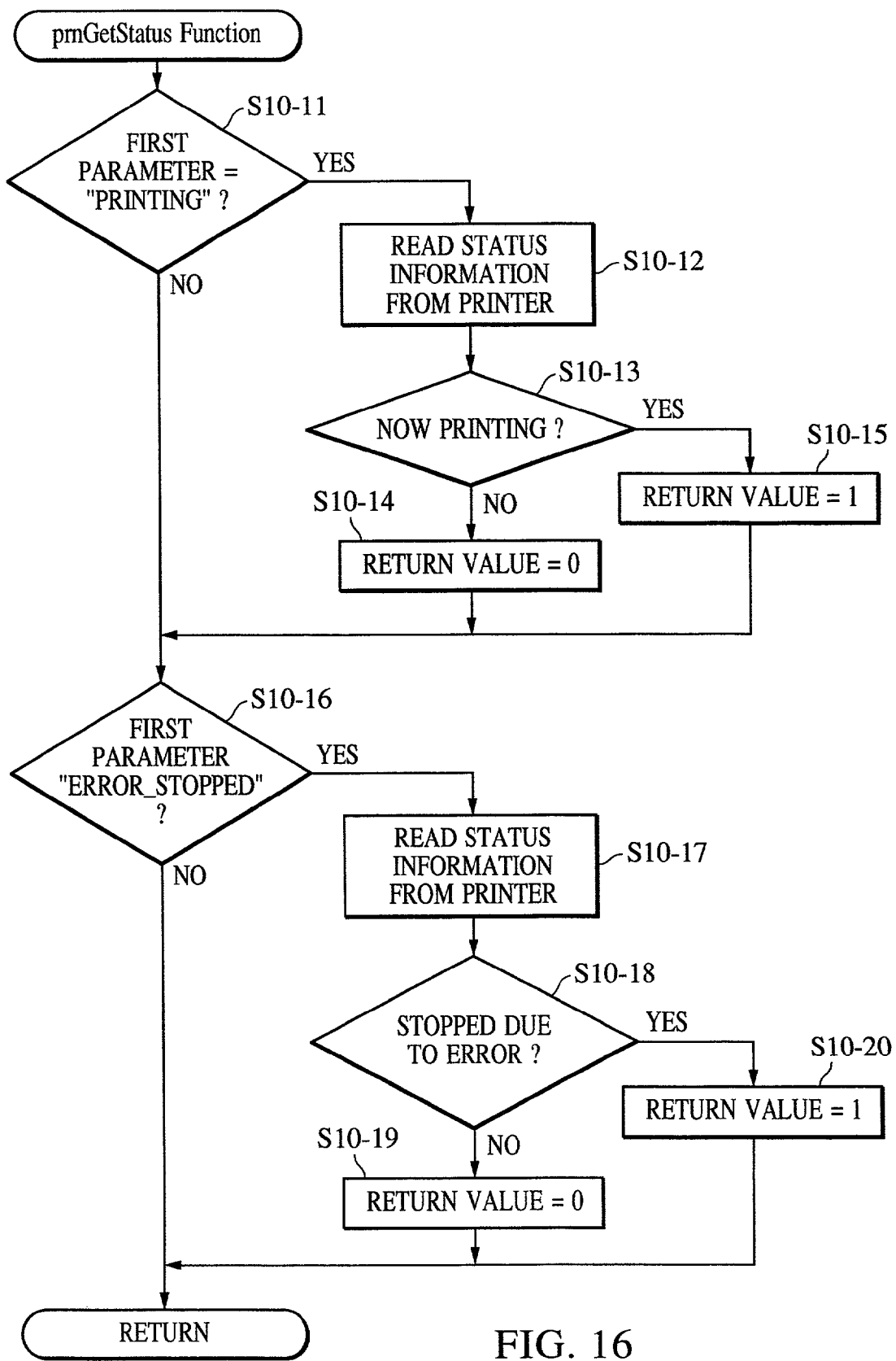
FIG. 16 is a flow diagram showing part of the operation of the data broadcasting browser in accordance with the first embodiment of the present invention.

In the print function of the script shown in FIGS. 9 through 11, a value is set in a timer (not shown) (see F in FIGS. 9 through 11). The script function is thus periodically called. In a call process, i.e., the process_timer_event, the extended DOM-API of prnGetStatus is called together with the parameter "printing" (see G in FIGS. 9 through 11). FIG. 16 shows this operation of the browser.

FIG. 16 is a flow diagram showing part of the operation of the data broadcasting browser in accordance with the first embodiment of the present invention. The browser responds to the call of the prnGetStatus. When the first parameter is "printing," the browser sends a status query command (step S10-12) to the printer 131. The browser checks whether the printer 131 is now printing (step S10-13). When the printer 131 is now printing, the return value is 1 (step S10-15). When the printer 131 is not printing, the return value is 0 (step S10-14).

The process returns in the script function process_timer_event shown in G in FIGS. 9 through 11, when the printer 131 is printing. When the printer 131 is not printing, the browser sets "err_stop" to the parameter and calls the prnGetStatus again. After checking that the printer 131 is not in an error stop (operational steps from step S10-16 through step S10-20 in FIG. 16), the browser calls a finished function, displays a message reading "printing completed," and ends the process.

The digital television receiver 100 of the first embodiment of the present invention includes the antenna and the tuner 101 for receiving the broadcast data, the descrambler 102 for acquiring the video data, the audio data, the image data, and the character data multiplexed in the data broadcasting radio wave, the memory 112 for storing the acquired data, the hard disk 119, the display unit 134 for displaying a variety of data, the IEEE1349 interface 114 for communicating with the printer 131, and the CPU 118 which controls the generation of the print data based on the stored data and output of the print data to the printer 131, the monitoring of the status of the printer 131, and the change of the display content of the display unit 134 in response to the status of the printer 131. By this arrangement, one of ordinary skill in the art will appreciate that the digital television receiver 100 has several advantages.

For example, in addition to the conventional data broadcasting service that permits video and audio reproduction only, the present invention provides a new service in which the printer 131 in communication with the digital television receiver 100 prints out information.

Also, unlike in the conventional art, the user of the present invention may print out related and detailed print data on the printer 131 only by operating the buttons on the remote controller 132 attached to the digital television receiver 100 while the user views the digital content of the ordinary broadcast display data.

Still further in step with the progress of the printing process of the printer 131, the display content of the broadcast data on the display unit 134 of the digital television receiver 100 is changed, and the user thus monitors the progress of the printing process on the digital television receiver 100. This arrangement enhances the ease of use of the apparatus.

Even when the printer 131 is malfunctioning such as, for example, when paper jams, a message prompting the user to take a proper solution step is displayed on the display unit 134 attached to the digital television receiver 100.

The broadcasting station may deliver a data broadcasting program such as "a guide to the use of a printer" to the user who has purchased a new printer. The user learns the use of the printer or the replacement method of an ink cartridge while watching the program by operating the remote controller 132 of the digital television receiver 100. In such a case, the user can switch the video and audio and a presentation of pictures and characters. The user thus effectively learns the use of the printer.

Second Embodiment

A digital television receiver 100 of a second embodiment of the present invention has a structure identical to that of the first embodiment. The digital television receiver 100 of the second embodiment includes a tuner 101, a descrambler 102, a transport decoder 103, an audio decoder 104, a D/A converter 105, a video decoder 106, a graphics buffer 121 containing a moving-picture plane 107, a still-picture plane 108, and a character/drawing plane 109, a graphics generator 110, an image synthesizer 111, a memory 112, a modem 113, an IEEE1349 interface 114, an operation panel 115, a photosensor 116, an IC card controller 117, a CPU 118, a hard disk 119, a serial interface 120, and a bus 122 (see FIG. 1). Also shown are a VTR (Video Tape Recorder) 130, a printer 131, a remote controller 132, a loudspeaker 133, and a display unit 134.

The remote controller 132 of the second embodiment of the present invention includes a photo unit 201, a power key 202, cursor keys 203, a "d" key (d button) 204, a display key 205, numerical keys 206, a menu button 207, up/down keys 208, and color keys 209 (see FIG. 2).

The digital television receiver 100, the VTR 130, the printer 131, the remote controller 132, the loudspeaker 133, and the display unit 134 of the second embodiment of the present invention are identical in structure to those of the first embodiment of the present invention, thus further discussion thereof is omitted.

The operation of the digital television receiver 100 of the second embodiment will now be discussed with reference to FIGS. 17 through 22.

FIGS. 17 through 19 explain the XML data for printing in accordance with the second embodiment of the present invention. In the second embodiment, as in the first embodiment, the browser reads the XML data into the memory 112 of the digital television receiver 100, and the initialize function defined by the onload attribute of the body element is executed (see A in FIGS. 17 through 22). In the initialize function, a status display reading "connect printer" is set and returned. The browser performs a rendering process, and presents a display on the display unit 134.

When the user connects the printer 131 to the IEEE1394 bus of the digital television receiver 100, or when the user switches on the printer 131, a script function set in the onoccur attribute of <de_item> contained in an <de_event> element described in (I) in FIGS. 17 through 19 is executed. In the second embodiment, the onoccur="process_device_event" is described, and this function is executed. The description of device_group="printer" means that the script function is executed in response to only an event from the printer 131.

As shown in D, E, F, G, and H in FIGS. 17 through 19, the process_device_event function determines the content of the event, and modifies the display content in response to the event. For example, when the event is "device_attach" meaning that the printer 131 is connected to the digital television receiver 100, the display unit 134 displays a message reading "printer is recognized, and checked" and the extended DOM-API querying the specifications of the printer 131 is called. The content of the event "print_finished" presents a message reading "printing completed" on the display unit 134.

The operation of an event monitoring task in the data broadcasting browser for issuing the events will now be discussed referring to FIG. 20 and FIG. 21.

Figure 20:
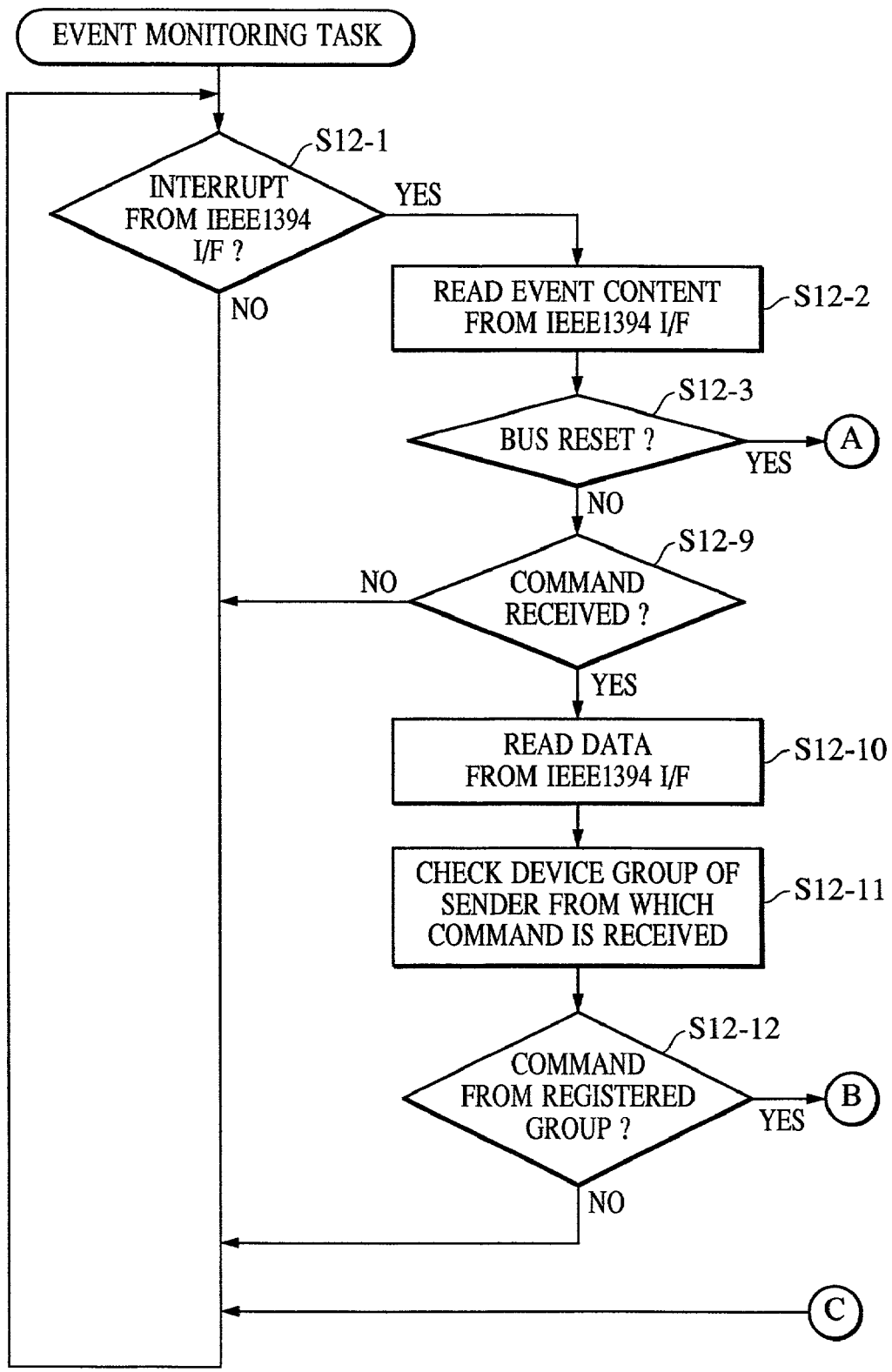
FIG. 20 is a flow diagram showing part of the operation of a data broadcasting browser in accordance with the second embodiment of the present invention.
Figure 21:
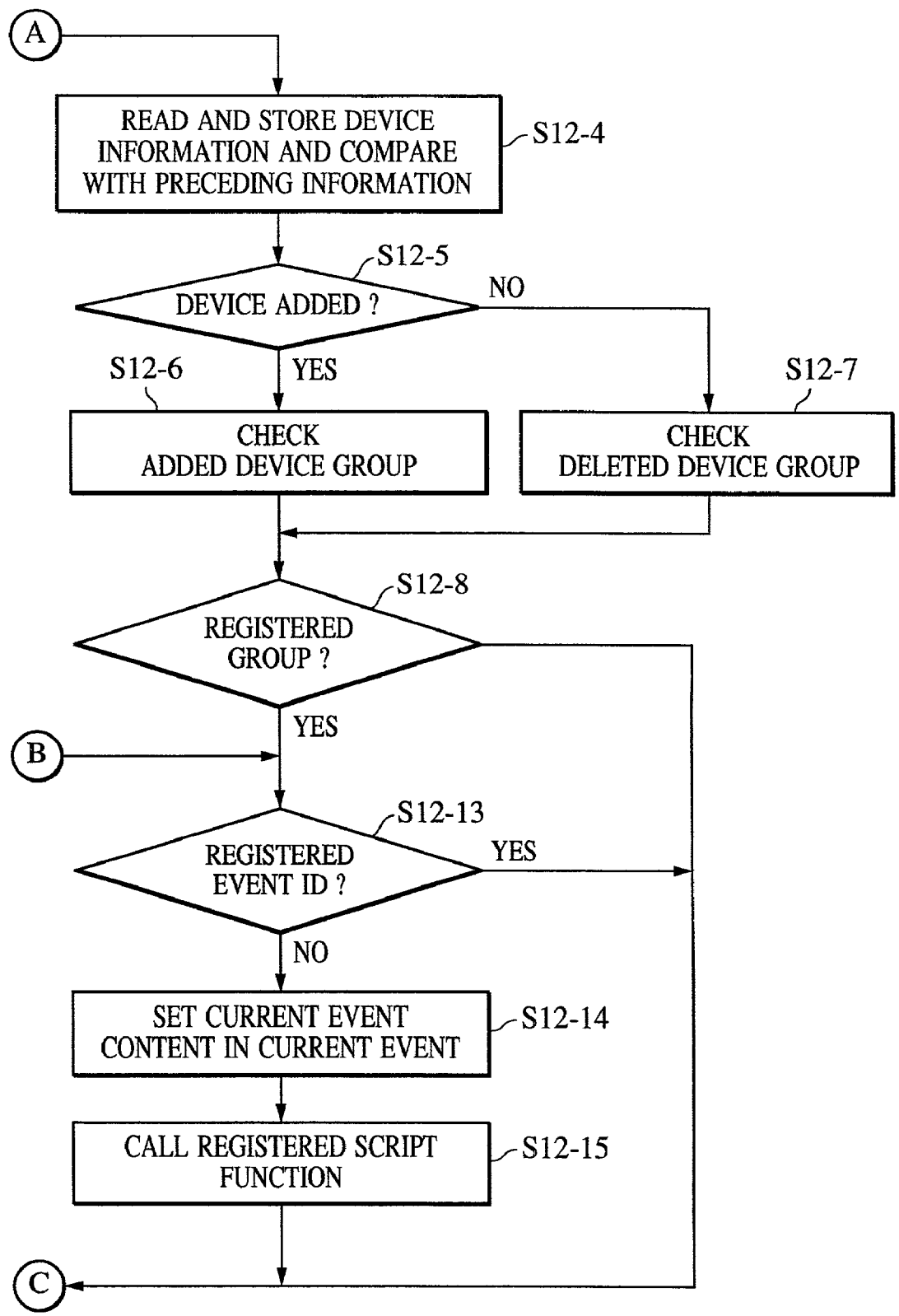
FIG. 21 is a flow diagram showing part of the operation of the data broadcasting browser in accordance with the second embodiment of the present invention.
Figure 22:
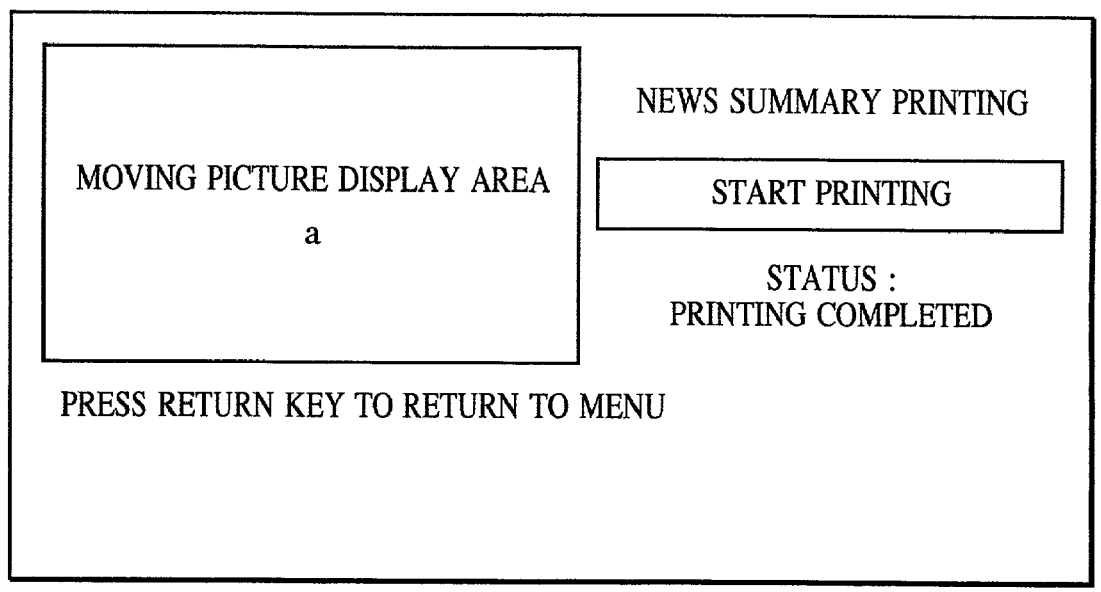
FIG. 22 shows a display example of the XML data in accordance with the second embodiment of the present invention.

FIG. 20 and FIG. 21 are flow diagrams showing part of the operation of (the event monitoring task by the browser) of the data broadcasting browser in accordance with the second embodiment of the present invention. The event monitoring task is initiated when the CPU 118 of the digital television receiver 100 receives an interrupt from the IEEE1394 interface 114 (step S12-1), and reads the content of information from the IEEE1394 interface 114 (step S12-2).

When the interrupt is a bus reset (Yes in step S12-3), the browser reads and stores a list of devices currently connected to the IEEE1394 bus, compares the list with a previously stored list to determine whether any device is added (step S12-4). When it is determined that a device is added (Yes in step S12-5), the browser reads a unit_spec_id area of the configuration ROM of the added device, and recognizes the type of the added device (step S12-6).

When the type of the device is identical to the one set in the device_group attribute in the <de_item> element of the XML data shown in FIGS. 17 through 19 (step S12-8), the browser compares the device with the value set in the event_id attribute in the <de_item> element (step S12-13).

Since no particular event_id is specified in the XML data shown in FIGS. 17 through 19, all of the event_ids are considered. Values are set for a variable DeviceGroup of an object called document.currentEvent which is an object accessible from the script, and for a variable Event ID (step S12-14), and a script function set in the onoccur in the <de_item> element is called (step S12-15).

For example, when the printer 131 is connected to the IEEE1394 bus of the digital television receiver 100, the value "printer" meaning a printer is set for the DeviceGroup variable, and the value "device_attached" meaning that the device is connected is set for the EventID variable. The script function called process_device_event in FIGS. 17 through 19 is executed.

When it is determined in step S12-3 that the interrupt is not a bus reset, the browser determines whether a command from an external device is received (step S12-9). When it is determined that a command has been received, the browser reads the data from the IEEE1349 interface 114 (step S12-10), recognizes the type of the device from which the command is originated (step S12-11), and proceeds to step S12-12. When the type of the device is identical to the one set in the device_group attribute of the <de_item> element in the XML data shown in FIG. 17 through FIG. 19, the browser proceeds to step S12-13, and takes the same process as already discussed.

Like the first embodiment, the digital television receiver of the second embodiment of the present invention provides a new service in which the printer 131 communicable with the digital television receiver 100 prints out information, in addition to the conventional data broadcasting service that permits video and audio reproduction only.

Alternate Embodiments

In the first and second embodiments of the present invention, data presently being broadcast is received and reproduced. However, it is to be appreciated that the present invention is not limited to this arrangement. For example, when a broadcast program, stored in the VTR 130, is reproduced, and when a digital content stored in the hard disk 119 in the digital television receiver 100 is reproduced, the same advantages are provided.

In the second embodiment, the display content of the status display is changed to "running out of paper," for example, when the digital television receiver 100 receives an event from the printer 131. Nevertheless, as one of ordinary skill in the art would appreciate that the present invention is not limited to this arrangement. For example, a moving picture or an audio sound may be switched in response to an event from the printer 131. When the digital television receiver 100 receives a command such as of running out of ink from the printer 131 as shown in G in FIGS. 17 through 19, the moving picture or the audio sound, being reproduced in the moving-picture area (the area represented by a in FIG. 22) in the event process, is switched.

In each of the first and second embodiments, the digital television receiver 100, the VTR 130, the printer 131, the loudspeaker 133, and the display unit 134 are separately arranged. However, the present invention is not limited to this arrangement. The digital television receiver 100, the VTR 130, the printer 131, the loudspeaker 133, and the display unit 134 may be integrated into a single unit.

A printer is cited as the external unit communicable to the digital television receiver 100 in each of the first and second embodiments. Nonetheless, it is to be appreciated that the present invention is not limited to this arrangement. The external device may be a multi-function peripheral (MFP) having an image reading function, a printing function, and a facsimile function.

The present invention may be implemented in a system constructed of a plurality of apparatuses or may be implemented in a standalone apparatus. For example, a storage medium storing a program code of software for carrying out the functions of the embodiments may be installed into a system or a apparatus, and a computer (CPU or MPU) in the system or the apparatus reads the program code stored in the storage medium. The object of the present invention is thus achieved.

The program code itself read from the storage medium performs the functions of the above embodiments, and the storage medium storing the program code falls within the scope of the present invention. Storage media available for feeding the program code may include, for example, a floppy disk, a hard disk, an optical disk, a magneto-optical disk, a CD-ROM, a CD-R, a magnetic tape, a nonvolatile memory card, ROM and the like. Also, the program code may be downloaded through a network.

By executing the program code read by the computer, the functions of the embodiments are performed. Furthermore, an OS (operating system) running on the computer performs in part or in whole an actual process, thereby executing the functions of the above embodiments. This arrangement also falls within the scope of the present invention.

The program code from the storage medium is read into a memory incorporated in a function expansion board in the computer or in a function expansion unit connected to the computer. The CPU mounted on the function expansion board or the function expansion unit performs partly or entirely the actual process in response to the instruction from the program code. The functions of the above embodiment are executed through the process. Such a program code falls within the scope of the present invention.

Figure 24:
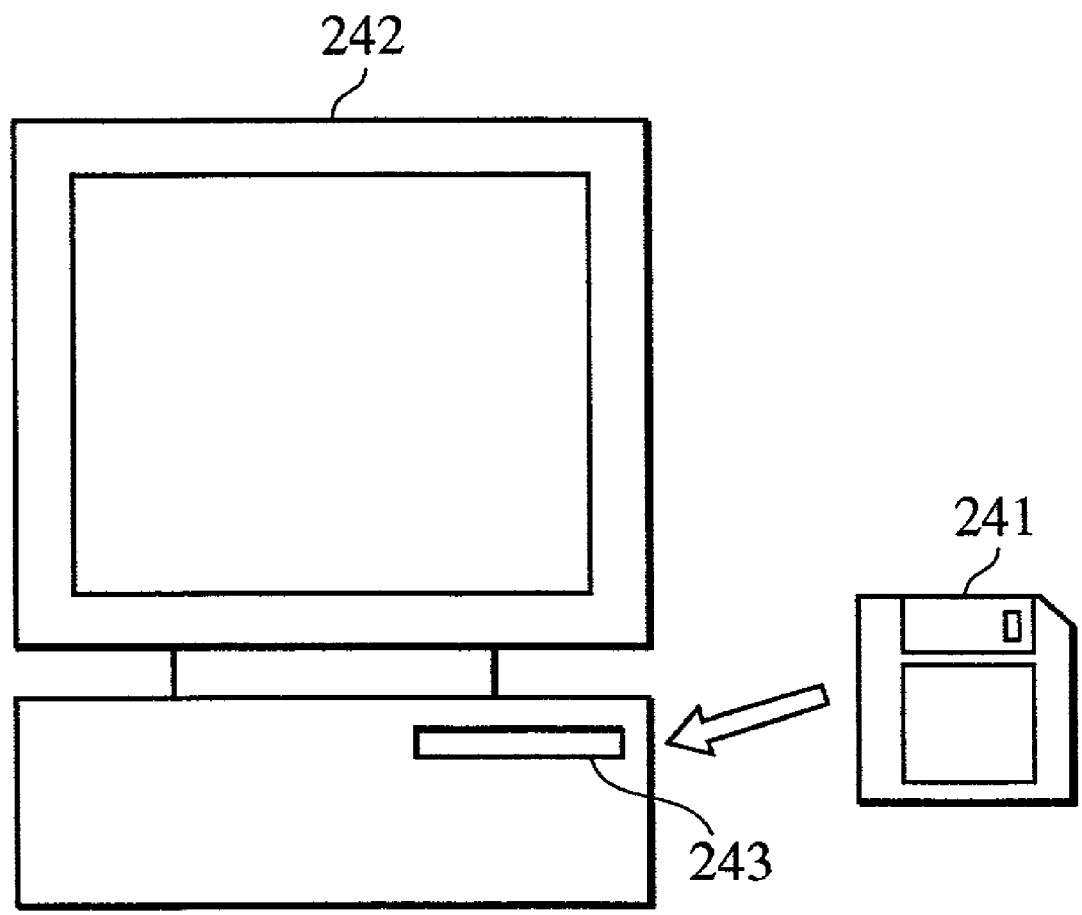
FIG. 24 shows a concept in which the program for executing the broadcast data receiving and reproducing method of the present invention and associated data are transferred from the storage medium to a computer, etc.
Figure 25:
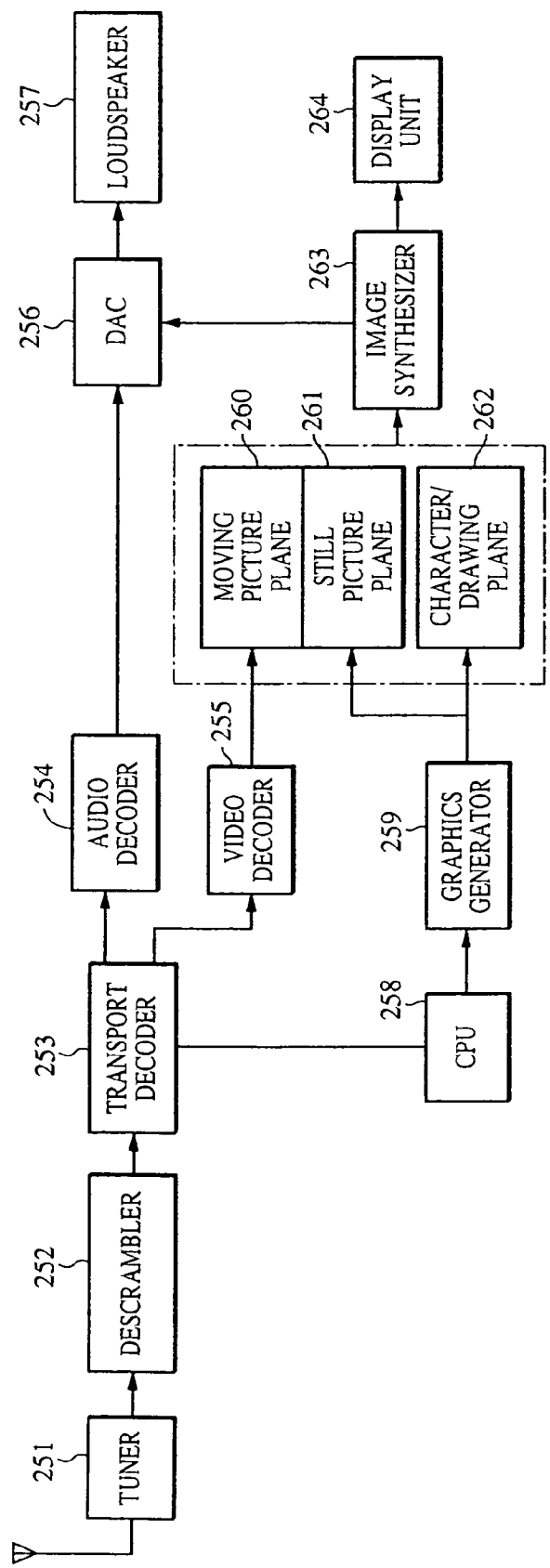
FIG. 25 is a block diagram showing the construction of a conventional television receiver which receives a satellite broadcast program.

FIG. 24 shows a concept in which a software program for executing the broadcast data receiving and reproducing method of the present invention and related data are delivered from a storage medium 241 to an apparatus 242 such as a computer. The software program for executing the broadcast data receiving and reproducing method of the present invention and the related data are delivered by inserting the storage medium 241, such as a floppy disk or a CD-ROM, into a socket 243 of a storage medium drive mounted on the apparatus 242. The software program and the related data are used by installing the software program and the related data in a hard disk, and then by loading the software program and the related data onto a RAM, or by loading the software program and related data directly on the RAM without installing the software program to the hard disk.

When the software program of the broadcast data receiving and reproducing method is executed on the digital television receiver 100 of each of the first and second embodiments, the software program and related data are fed to the digital television receiver 100 through the apparatus such as the computer as shown in FIG. 24, or the software program and related data are stored beforehand in the digital television receiver 100.

Figure 23:
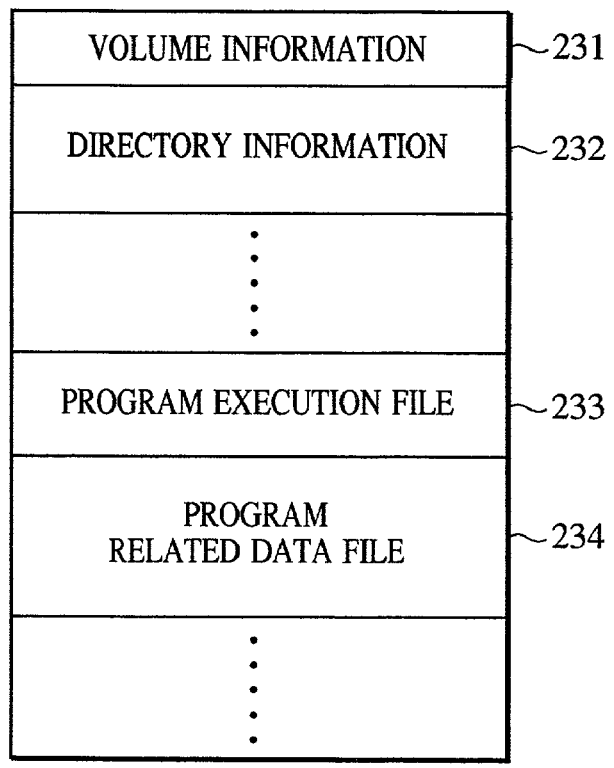
FIG. 23 shows the storage content of a storage medium that stores a program for executing a broadcast data receiving and reproducing method of the present invention and associated data.

FIG. 23 illustrates the memory structure of the storage medium that stores the software program for executing the broadcast data receiving and reproducing method of the present invention and the related data. The storage medium includes a storage content such as volume information 231, directory information 232, a program execution file 233, and a program related data file 234. The software program for executing the broadcast data receiving and reproducing method of the present invention is program-coded in accordance with the above-referenced flow diagrams and control procedures.

Each of the above-referenced embodiments uses the IEEE1394 for connection with an external device. Alternatively, another bus system or a network system may be employed.

In accordance with the present invention, the digital television receiver of the present invention provides a new service in which the printer 131 communicable with the digital television receiver 100 prints out information, in addition to the conventional data broadcasting service that permits video and audio reproduction only.

Unlike in the conventional art, the user prints out related and detailed print data on the printer 131 only by operating the buttons on the remote controller 132 attached to the digital television receiver 100 while the digital content of the ordinary broadcast display data is viewed.

In step with the progress of the printing process of the printer 131, the display content of the broadcast data on the display unit 134 of the digital television receiver 100 is changed, and the user thus monitors the progress of the printing process on the digital television receiver 100. This arrangement enhances the ease of use of the apparatus.

Even when the printer 131 is malfunctioning such as when paper jams, a message prompting the user to take a proper solution step is displayed on the display unit 134 attached to the digital television receiver 100.

The broadcasting station may deliver a data broadcasting program such as "a guide to the use of a printer" to the user who has just purchased a new printer. The user learns the use of the printer or the replacement method of an ink cartridge while watching the program by operating the remote controller 132 of the digital television receiver 100. In such a case, the user can switch the video and audio and a presentation of pictures and characters. The user thus effectively learns the use of the printer.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A television signal receiving apparatus (a) connected to a printer in a manner to allow the apparatus to communicate with the printer and (b) capable of sending to the printer data obtained from contents data, the contents data having been sent multiplexed in broadcast by a broadcasting apparatus and received by said television signal receiving apparatus, said television signal receiving apparatus comprising:
   extracting means for extracting document data which is described in a markup language and included in the contents data, the document data including (a) a script for acquiring status information of the printer and (b) a plurality of status display information;
   generating means for generating display image data which can be displayed on a display unit, using the document data extracted by said extracting means; and
   executing means for executing a process for acquiring the status information of the printer as well as a process for, in accordance with the acquired status information, identifying status display information indicating a status of the printer from the plurality of status display information included in the document data, said executing means comprising means for executing the script,
   wherein said generating means reflects, in the display image data, the status display information identified by said executing means,
   wherein said executing means has a timer for executing the script at a predetermined period.

2. An apparatus according to claim 1, wherein said executing means acquires status information of the printer at a predetermined period by starting an operation of the timer after the content data for printing is sent to the printer.

3. A television signal receiving apparatus (a) connected to a printer in a manner to allow the apparatus to communicate with the printer and (b) capable of sending to the printer data obtained from contents data, the contents data having been sent multiplexed in broadcast by a broadcasting apparatus and received by said television signal receiving apparatus, said television signal receiving apparatus comprising:
   extracting means for extracting document data which is described in a markup language and included in the contents data, the document data including (a) a script for acquiring status information of the printer and (b) a plurality of status display information;
   generating means for generating display image data which can be displayed on a display unit, using the document data extracted by said extracting means; and
   executing means for executing a process for acquiring the status information of the printer as well as a process for, in accordance with the acquired status information, identifying status display information indicating a status of the printer from the plurality of status display information included in the document data, said executing means comprising means for executing the script,
   wherein said generating means reflects, in the display image data, the status display information identified by said executing means,
   wherein said executing means includes a command to switch the power of the printer on after the status information of the printer is acquired.

4. A television signal receiving method for use with a printer, said method comprising the steps of:
   extracting document data which is described in a markup language and included in contents data, the contents data having been sent multiplexed in broadcast by a broadcasting apparatus, the document data including (a) a script for acquiring status information of the printer and (b) a plurality of status display information;
   generating display image data which can be displayed on a display unit, using the document data extracted by said extracting step; and executing a process for acquiring the status information of the printer as well as a process for, in accordance with the acquired status information, identifying status display information indicating a status of the printer from the plurality of status display information included in the document data, said executing step comprising a step of executing the script, wherein said generating step reflects, in the display image data, the status display information identified by said executing step, wherein said executing step uses a timer for executing the script at a predetermined period.

5. A method according to claim 4, wherein said executing step acquires status information of the printer at a predetermined period by starting an operation of the timer after the content data for printing is sent to the printer.

6. A television signal receiving method for use with a printer, said method comprising the steps of:

extracting document data which is described in a markup language and included in contents data, the contents data having been sent multiplexed in broadcast by a broadcasting apparatus, the document data including (a) a script for acquiring status information of the printer and (b) a plurality of status display information;

generating display image data which can be displayed on a display unit, using the document data extracted by said extracting step; and executing a process for acquiring the status information of the printer as well as a process for, in accordance with the acquired status information, identifying status display information indicating a status of the printer from the plurality of status display information included in the document data, said executing step comprising a step of executing the script, wherein said generating step reflects, in the display image data, the status display information identified by said executing step, wherein said executing step includes a command to switch the power of the printer on after the status information of the printer is acquired.

7. A television signal receiving apparatus (a) connected to a printer in a manner to allow the apparatus to communicate with the printer and (b) capable of sending to the printer data obtained from contents data, the contents data having been sent multiplexed in broadcast by a broadcasting apparatus and received by said television signal receiving apparatus, said television signal receiving apparatus comprising:

extracting means for extracting document data which is described in a markup language and included in the contents data, the document data including (a) a script for acquiring status information of the printer and (b) a plurality of status display information;

generating means for generating display image data which can be displayed on a display unit, using the document data extracted by said extracting means; and executing means for executing a process for acquiring the status information of the printer as well as a process for, in accordance with the acquired status information, identifying status display information indicating a status of the printer from the plurality of status display information included in the document data, said executing means comprising means for executing the script, wherein said generating means reflects, in the display image data, the status display information identified by said executing means, wherein the document data further comprises print button text, and wherein said generating means further reflects in the display image data a print button image in accordance with the print button text.

* * * * *